(12) United States Patent
Kagechi et al.

(10) Patent No.: US 7,830,966 B2
(45) Date of Patent: Nov. 9, 2010

(54) IMAGE ENCODING DEVICE

(75) Inventors: Kensaku Kagechi, Nara (JP); Hisashi Saiga, Nara (JP); Keisuke Iwasaki, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1444 days.

(21) Appl. No.: 11/236,010

(22) Filed: Sep. 26, 2005

(65) Prior Publication Data
US 2006/0023793 A1 Feb. 2, 2006

Related U.S. Application Data

(62) Division of application No. 10/070,957, filed on Jun. 10, 2002, now Pat. No. 7,016,420.

(51) Int. Cl.
*H04N 7/12* (2006.01)
*H04N 11/02* (2006.01)
*H04N 11/04* (2006.01)
*H04B 1/66* (2006.01)

(52) U.S. Cl. .................................. 375/240.26

(58) Field of Classification Search ........................ None
See application file for complete search history.

(56) References Cited

U.S. PATENT DOCUMENTS 5,410,351 A 4/1995 Kojima
5,598,184 A * 1/1997 Barkans ....................... 345/597

(Continued)

FOREIGN PATENT DOCUMENTS

EP 0 924 933 A 6/1999

(Continued)

OTHER PUBLICATIONS

Fu-Huei Lin et al., "An Optimization of MPEG to Maximize Subjective Quality", Proceedings of the International Conference on Image Processing (ICIP) Washington, Oct. 23-26, 1995 [Proceedings of the International Conference on Image Processing, (ICIP)] Los Alomos, IEEE Comp. Soc. Press, US, vol. 2, Oct. 23, 1995, pp. 547-550, X010197027, ISBN 978-0-7803-3122-8.

(Continued)

*Primary Examiner*—Nhon T Diep
(74) *Attorney, Agent, or Firm*—Edwards Angell Palmer & Dodge LLP; David G. Conlin; David A. Tucker

(57) ABSTRACT

The object of the present invention is to provide an image encoding device and decoding device which allows the maximum compression rate to be achieved with a visually uniform level of picture quality.

The present invention has a characteristic pixel extractor 0309 which encodes input images by small region unit in accordance with an irreversible compression method, decodes the encoded data which is created, and utilizes the input image and decoded image obtained after decoding to extract characteristic pixels, a characteristic distortion calculator 0311 which utilizes characteristic pixels to calculate characteristic distortion of the decoded image in relation to the input image, and an encoding parameter controller 0312 which controls parameter values determining the degree of data compression in line with the extent of characteristic distortion. The regions of picture quality of a visually uniform level thus obtained are all compressed using an image compression method with a high compression efficiency, thus allowing the maximum compression rate to be achieved.

10 Claims, 18 Drawing Sheets

U.S. PATENT DOCUMENTS

| | | | |
|---|---|---|---|
| 5,737,031 A | 4/1998 | Tzidon et al. | |
| 5,754,697 A * | 5/1998 | Fu et al. | 382/232 |
| 6,042,208 A * | 3/2000 | Wen | 347/6 |
| 6,320,907 B1 | 11/2001 | Pau et al. | |
| 6,366,705 B1 | 4/2002 | Chiu et al. | |
| 6,404,814 B1 | 6/2002 | Apostolopoulos et al. | |
| 6,441,842 B1 | 8/2002 | Fandrianto et al. | |
| 6,442,202 B1 | 8/2002 | Borer | |
| 6,563,946 B2 * | 5/2003 | Kato | 382/166 |

FOREIGN PATENT DOCUMENTS

| | | |
|---|---|---|
| JP | 63-125076 | 5/1988 |
| JP | 2-44883 | 2/1990 |
| JP | 4-56492 | 2/1992 |
| JP | 05-227510 | 9/1993 |
| JP | 05-227512 | 9/1993 |
| JP | 7-23394 | 1/1995 |
| JP | 7-162689 | 6/1995 |
| JP | 7-250326 | 9/1995 |
| JP | 07-250327 | 9/1995 |
| JP | 8-125868 | 5/1996 |
| JP | 08-242376 | 9/1996 |
| JP | 8-251420 | 9/1996 |
| JP | 09-055939 | 2/1997 |
| JP | 9-98414 | 4/1997 |
| JP | 10-243261 | 9/1998 |
| JP | 11-055672 | 2/1999 |
| JP | 11055672 A | 2/1999 |

OTHER PUBLICATIONS

Satoshi, Kondo, et al.: "A Real-Time Variable Bit Rate MPEG2 Video Coding Method for Digital Storage Media", 19970801, vol. 43, No. 3, Aug. 1, 1997 pp. 537-543, XP011083571.

* cited by examiner

FIG.9

| INPUT | OUTPUT | INPUT | OUTPUT | INPUT | OUTPUT | INPUT | OUTPUT | INPUT | OUTPUT | INPUT | OUTPUT |
|---|---|---|---|---|---|---|---|---|---|---|---|
| 0 | 0 | 43 | 7 | 86 | 28 | 129 | 65 | 172 | 108 | 215 | 151 |
| 1 | 0 | 44 | 7 | 87 | 29 | 130 | 66 | 173 | 109 | 216 | 152 |
| 2 | 0 | 45 | 7 | 88 | 30 | 131 | 67 | 174 | 110 | 217 | 153 |
| 3 | 0 | 46 | 8 | 89 | 30 | 132 | 68 | 175 | 111 | 218 | 154 |
| 4 | 0 | 47 | 8 | 90 | 31 | 133 | 69 | 176 | 112 | 219 | 155 |
| 5 | 0 | 48 | 9 | 91 | 32 | 134 | 70 | 177 | 113 | 220 | 156 |
| 6 | 0 | 49 | 9 | 92 | 33 | 135 | 71 | 178 | 114 | 221 | 157 |
| 7 | 0 | 50 | 9 | 93 | 33 | 136 | 72 | 179 | 115 | 222 | 158 |
| 8 | 0 | 51 | 10 | 94 | 34 | 137 | 73 | 180 | 116 | 223 | 159 |
| 9 | 0 | 52 | 10 | 95 | 35 | 138 | 74 | 181 | 117 | 224 | 160 |
| 10 | 0 | 53 | 10 | 96 | 36 | 139 | 75 | 182 | 118 | 225 | 161 |
| 11 | 0 | 54 | 11 | 97 | 36 | 140 | 76 | 183 | 119 | 226 | 162 |
| 12 | 0 | 55 | 11 | 98 | 37 | 141 | 77 | 184 | 120 | 227 | 163 |
| 13 | 0 | 56 | 12 | 99 | 38 | 142 | 78 | 185 | 121 | 228 | 164 |
| 14 | 0 | 57 | 12 | 100 | 39 | 143 | 79 | 186 | 122 | 229 | 165 |
| 15 | 0 | 58 | 13 | 101 | 39 | 144 | 80 | 187 | 123 | 230 | 166 |
| 16 | 1 | 59 | 13 | 102 | 40 | 145 | 81 | 188 | 124 | 231 | 167 |
| 17 | 1 | 60 | 14 | 103 | 41 | 146 | 82 | 189 | 125 | 232 | 168 |
| 18 | 1 | 61 | 14 | 104 | 42 | 147 | 83 | 190 | 126 | 233 | 169 |
| 19 | 1 | 62 | 15 | 105 | 43 | 148 | 84 | 191 | 127 | 234 | 170 |
| 20 | 1 | 63 | 15 | 106 | 43 | 149 | 85 | 192 | 128 | 235 | 171 |
| 21 | 1 | 64 | 16 | 107 | 44 | 150 | 86 | 193 | 129 | 236 | 172 |
| 22 | 1 | 65 | 16 | 108 | 45 | 151 | 87 | 194 | 130 | 237 | 173 |
| 23 | 2 | 66 | 17 | 109 | 46 | 152 | 88 | 195 | 131 | 238 | 174 |
| 24 | 2 | 67 | 17 | 110 | 47 | 153 | 89 | 196 | 132 | 239 | 175 |
| 25 | 2 | 68 | 18 | 111 | 48 | 154 | 90 | 197 | 133 | 240 | 176 |
| 26 | 2 | 69 | 18 | 112 | 49 | 155 | 91 | 198 | 134 | 241 | 177 |
| 27 | 2 | 70 | 19 | 113 | 49 | 156 | 92 | 199 | 135 | 242 | 178 |
| 28 | 3 | 71 | 19 | 114 | 50 | 157 | 93 | 200 | 136 | 243 | 179 |
| 29 | 3 | 72 | 20 | 115 | 51 | 158 | 94 | 201 | 137 | 244 | 180 |
| 30 | 3 | 73 | 20 | 116 | 52 | 159 | 95 | 202 | 138 | 245 | 181 |
| 31 | 3 | 74 | 21 | 117 | 53 | 160 | 96 | 203 | 139 | 246 | 182 |
| 32 | 4 | 75 | 21 | 118 | 54 | 161 | 97 | 204 | 140 | 247 | 183 |
| 33 | 4 | 76 | 22 | 119 | 55 | 162 | 98 | 205 | 141 | 248 | 184 |
| 34 | 4 | 77 | 23 | 120 | 56 | 163 | 99 | 206 | 142 | 249 | 185 |
| 35 | 4 | 78 | 23 | 121 | 57 | 164 | 100 | 207 | 143 | 250 | 186 |
| 36 | 5 | 79 | 24 | 122 | 58 | 165 | 101 | 208 | 144 | 251 | 187 |
| 37 | 5 | 80 | 25 | 123 | 59 | 166 | 102 | 209 | 145 | 252 | 188 |
| 38 | 5 | 81 | 25 | 124 | 60 | 167 | 103 | 210 | 146 | 253 | 189 |
| 39 | 5 | 82 | 26 | 125 | 61 | 168 | 104 | 211 | 147 | 254 | 190 |
| 40 | 6 | 83 | 26 | 126 | 62 | 169 | 105 | 212 | 148 | 255 | 191 |
| 41 | 6 | 84 | 27 | 127 | 63 | 170 | 106 | 213 | 149 | | |
| 42 | 6 | 85 | 28 | 128 | 64 | 171 | 107 | 214 | | | |

IMAGE ENCODING DEVICE

This application is a Division of U.S. patent application Ser. No. 10/070,957, entitled IMAGE ENCODING DEVICE, filed 10 Jun. 2002 now U.S. Pat. No. 7,016,420, by Kensaku Kagechi, Hisashi Saiga and Keisuke Iwasaki (the same inventors as the inventors of this Divisional Application).

TECHNICAL FIELD

The present invention relates to an image encoding device which makes it possible to reduce capacity while suppressing deterioration of picture quality, and to the corresponding decoding device.

BACKGROUND ART

Almost all the picture quality compression method widely used on the Internet, in digital cameras and elsewhere are irreversible compression method which efficiently reduce the volume of image data. Thanks to irreversible compression methods it has become easier to exchange and storage image data over networks.

Irreversible image compression methods include those like the JPEG compression method which permit flexible adjustment of the compression rate by setting compression parameters, while others achieve a higher compression rate at the cost of deterioration of picture quality or suppress deterioration of picture quality by lowering the compression rate.

Japanese Patent No. 2807222 is an example of an image compression device which sets compression parameters automatically to the optimum value. The image compression device disclosed here creates a residual image by subtracting between the original input image and the reconverted image. It then calculates the mean square error from data relating to this residual image, and uses this as a picture quality evaluation value to optimise compression parameters.

Another conventional technique for improving picture quality after decoding involves either compressing so that the whole pixel region is the same without regard to the characteristics of the display terminal etc., or as in the case of the image processing device disclosed in Japanese Laid-Open Patent Application H8[1996]-242376 taking the characteristics of the display terminal etc. into consideration and compensating by using a gamma curve to expand the dynamic range of pixel regions which are difficult to make out in detail on the display terminal etc.

An example of an image encoding device which uses different image compression methods according to pixel region in order to encode images is provided by the image data compression device disclosed in Japanese Laid-Open patent application H6[1994]-225160. The image data compression device disclosed here varies the image compression method depending on the number of colours contained within a specified region of the input image data. If a reversible compression method is used where the number of colours is great, the volume of compression data increased, and consequently it employs an irreversible compression method here, reserving the reversible method for where the number of colours is fewer.

However, although the aforesaid irreversible image compression method is capable of very flexible adjustments to picture quality and compression rate by means of compression parameters, its potential has not been used to the full. The principal reason for this is that even if the compression parameter has the same value, compression rate and picture quality after compression vary greatly, so that it is difficult to infer picture quality after compression from the compression parameters.

There have hitherto been devices which set compression parameters automatically, but they have employed mean square error or SN ratio as evaluation values, and have not sufficiently taken the characteristics of human vision into account. Accordingly, it has been necessary to set the compression parameters manually if the highest compression rate commensurate with picture quality acceptable to the user was needed, and it has been necessary to adjust compression parameters while checking picture quality after compression with the naked eye.

It is an object of the present invention to facilitate the automatic setting of compression parameters reflecting the characteristics of human vision by extracting pixel regions which are felt have deteriorated visually and either to utilise only the degree of distortion thereof for the evaluation of picture quality or by classifying the blocks according to their properties to set up a separate criterion for evaluation.

Especially with the JPEG compression method which compresses images by block units and other image compression methods utilising DCT conversion techniques, compression is achieved basically block by block, and there is no effect on picture quality between blocks after compression.

For this reason, the present invention proposes a method of evaluation whereby picture quality is assessed by calculating distortion by the block units used during compression, correctly detecting localised deterioration in picture quality.

Moreover, in image compression methods using DCT conversion techniques there has been a tendency when the conventionally used mean square error or SN ratio was applied to compressed picture quality for evaluation values to be small in relation to images with low activity of pixel values and greater where activity was higher.

Two well-known types of distortion peculiar to image compression using DCT conversion are block noise (noise whereby the periphery of a block becomes discontinuous) and mosquito noise (noise generated on the periphery of steep edges). Block noise occurs where the activity of pixel values is low, and as already mentioned, evaluation values with mean square error and SN ratio are small, making block noise difficult to detect with certainty.

Moreover, block noise tends to be prominent visually when it is flattened (when the AC component is 0).

In blocks where the AC component is 0 in both the X and Y directions all the pixel values within the block tally.

Moreover, in blocks where the AC component is all 0 in the X direction, pixel values tally within all the columns. Similarly, in blocks where the AC component is all 0 in the Y direction, pixel values tally within all the rows.

In the image encoding device to which the present invention pertains, blocks are classified according to the properties of pixel values within the block after compression, and it is possible to detect blocks in which noise is generated by establishing evaluation criteria which take into account the ease of noise generation within each classified block.

Blocks in which mosquito noise is generated have high conventional mean square error or SN ratio evaluation values. Blocks with high activity often have these high evaluation values even if mosquito noise is not generated, and it is impossible to detect mosquito noise with certainty.

Mosquito noise is a phenomenon where the effect of steep edges in some blocks appears on the periphery, and those blocks in which it is generated differ greatly as to distortion of pixels within the block.

The present invention makes it possible to detect mosquito noise correctly by calculating divergence in the differences between pixel values of the original image and compressed image.

There have hitherto been techniques for improving picture quality after decoding by compensatory expansion of the dynamic range of pixel regions which are difficult to make out in detail on the display terminal etc. by taking into account the properties of the display terminal etc. and using gamma curves. An example is the image processing device disclosed in Japanese Laid-Open Patent Application H8[1996]-242376. However, there have been no image encoding and decoding devices which encode after first reducing the dynamic range of the whole pixel value region where deterioration is not prominent thanks to the properties of the display terminal etc., reinstating the dynamic range of the whole decoded pixel value region.

It is an object of the image encoding device to which the present invention pertains to increase the compression rate considerably by encoding after first reducing the dynamic range of the whole pixel value region, for instance by reducing that of regions where the pixel value is low as in FIG. 8(A).

It is an object of the image decoding device to which the present invention pertains to expand the dynamic range of all the pixel value region of the decoded image so that after decoding it is the same as the whole pixel value region of the image prior to encoding, and by using it in combination with this image, decoding device to raise the compression rate considerably without any deterioration in the visual picture quality.

It is an object of the image encoding device to which the present invention pertains to place emphasis on an image compression method exhibiting high compression performance, being a combination of a plurality of image compression methods, by employing a method of evaluation which allows pronounced visual deterioration in the form of mosquito noise and block noise to be detected with certainty to allow regions where it is possible to secure a uniform level of picture quality set visually with the aid of a high-performance image compression all to be compressed by a high-performance image compression method, detecting other regions where it is possible to maintain picture quality in the same way with the aid of a secondary high-performance image compression method and compressing them with the aid of that image compression method, thus determining one after the other from the highest rate of compression so as to maintain a visually uniform level of picture quality and achieve the maximum compression rate.

DISCLOSURE OF THE INVENTION

The image encoding device to which the present invention pertains has means of image encoding which encodes images in accordance with an irreversible compression method capable of processing input images in small region units, means of image decoding which decodes encoded data created with the means of encoding, means of characteristic pixel extraction which utilises input images and decoded images obtained by the means of image decoding to extract characteristic pixels, means of calculating characteristic distortion which utilises characteristic pixels to calculate characteristic distortion of the decoded images in relation to the input images, and means of parameter value control which controls parameter values determining the extent of data compression in the means of image encoding in accordance with the characteristic distortion.

The means of calculating characteristic distortion calculates the dispersion of differences between pixel values corresponding to the input images and decoded images by small regions, taking the maximum value thereof as the size of the characteristic distortion. Thus, it is possible to set quantisation parameters correctly reflecting mosquito noise because of the considerable effect of phase divergence. In addition, the means of calculating characteristic distortion calculates the differences between pixel values corresponding to the input images and decoded images together with the sum of the difference between those differences and the average by small regions, taking the maximum value thereof as the size of the characteristic distortion. Thus, it is possible to set quantisation parameters reflecting mosquito noise with a simple calculation.

The small regions are blocks, the means of extracting characteristic pixels is means of extracting characteristic blocks which utilises the decoded and input images in order to extract characteristic blocks, pixels being extracted within the characteristic blocks. Thus, it is possible to set quantisation parameters correctly reflecting block noise. Moreover, the means of extracting characteristic blocks extracts blocks wherein the pixel values of the input images do not tally in all the rows or all the columns within the block, and extracts blocks of decoded images corresponding to the blocks which have been extracted wherein the pixel values of the decoded images tally in all the rows or all the columns within the block. Thus, it is possible to set quantisation parameters reflecting block noise with a simple calculation.

The means of extracting characteristic blocks extracts blocks wherein the pixel values of the input images do not all tally, and extracts blocks of decoded images corresponding to the blocks which have been extracted wherein all the pixel values of the decoded images tally. Thus, it is possible to set quantisation parameters reflecting block noise with a simple calculation.

The means of extracting characteristic blocks is a means of classifying and extracting characteristic blocks which classifies and extracts characteristic blocks, extracting pixels within the characteristic blocks. Thus, it is possible to set quantisation parameters reflecting block noise with a simple calculation.

The means of classifying and extracting characteristic blocks extracts blocks of decoded images having first classified them into perfect flat blocks wherein all the pixel values tally, blocks other than perfect flat blocks wherein the pixel values in all the rows or on all the columns tally, and other blocks. Thus, it is possible to set quantisation parameters reflecting block noise with a simple calculation.

The means of calculating characteristic distortion calculates block by block the dispersion of differences between the input image and pixels corresponding to the characteristic pixels of the decoded image, taking the maximum value for each classification classified by the means of classifying and extracting characteristic blocks as the characteristic distortion for each classification. Thus, it is possible to set quantisation parameters correctly reflecting mosquito noise because of the considerable effect of phase divergence.

The image encoding device to which the present invention pertains has a pixel value converter which performs pixel value conversion whereby a pixel value conversion table is used to reduce the dynamic range of pixel value areas where it is difficult to detect visual deterioration of the input image signal, and means of image encoding which encodes images output from the pixel value converter. Thus, encoding is implemented after executing a conversion whereby the dynamic range is reduced over all the pixel values, thus making it possible to raise the compression rate considerably.

The image encoding device to which the present invention pertains has means of image encoding which encodes input images in accordance with an irreversible compression method, means of image decoding which decodes encoded data created by the means of image encoding, means of calculating characteristic distortion which calculates characteristic distortion by comparing the decoded image and the input image by small region units, means of dividing regions which divides regions by small region units in accordance with the degree of characteristic distortion, creating region-divided images with region-divided information, means of creating region images which utilizes input and region-divided images to create region images, means of encoding region-divided images which encodes region-divided images in accordance with an irreversible compression method and creates region-divided image encoded data, means of encoding first-region images which encodes in accordance with an irreversible compression method the image of a stipulated region divided by the means of dividing regions, means of encoding second-region images which encodes images of other regions with the required picture quality, and means of combining encoded data which combines region-divided image encoded data and encoded data for each region into a single set of encoded data.

By making use of a gamma curve the pixel value conversion table makes it possible to take into account the characteristics of the display terminal etc. and reduce the volume of compression data without detracting from visual picture quality.

The image decoding device to which the present invention pertains decodes encoded data encoded by the image encoding device, and has means of image decoding which decodes encoded data, and means of reconverting pixel values which utilises a pixel value reconversion table to reconvert the pixel values of decoded images decoded by the means of image decoding. This expands the dynamic range over all the pixel values of the decoded image so that it is equal to that prior to encoding, thus allowing the compression rate to be increased considerably without detracting from visual picture quality. The input/output relationship of the means of reconverting pixel values is the opposite of that of the means of converting pixel values, making for simplicity of configuration.

The means of calculating characteristic distortion calculates the dispersion of differences between pixels corresponding to small regions extracted from the input image and decoded image, regarding this as the extent of characteristic distortion. Thus, it is possible to set quantisation parameters correctly reflecting mosquito noise because of the considerable effect of phase divergence.

The means of calculating characteristic distortion calculates the differences between pixel values corresponding to the input images and decoded images together with the sum of the difference between those differences and the average by small regions, taking the maximum value thereof as the size of the characteristic distortion. Thus, it is possible to set quantisation parameters reflecting mosquito noise with a simple calculation.

The means of region division divides according to the relationship between the extent of characteristic distortion and the threshold value, so that it is possible to create calculate region-divided images with the aid of a simple calculation.

The small regions units are block units, the means of region division is means of classifying the properties of extracted small regions, and the thresholds are determined separately by classification, thus making it possible to create region-divided images with the aid of a simple calculation.

The means of classifying the properties of extracted small regions classifies extracted small regions of decoded images into perfect flat blocks where all the pixel values tally, blocks other than perfect flat blocks where the pixel values in either all the rows or all the columns tally, and other blocks. Thus it is possible to set quantisation parameters which accurately reflect noise.

The image decoding device to which the present invention pertains has means of dividing encoded data which divides encoded data generated by the image encoding device into region-divided image encoded data and encoded data for each region, a region-divided image decoding device which creates region-divided images by decoding region-divided image encoded data, decoders for each region which decode encoded data for each region and create images for each region, and a decoded image data combiner which combines images for each region in accordance with the region-divided image and creates a single decoded image.

BRIEF DESCRIPTION OF THE DRAWINGS

FIG. 9 is a pixel value conversion table in the third embodiment;

BEST MODE FOR CARRYING OUT THE INVENTION

Figure 1:
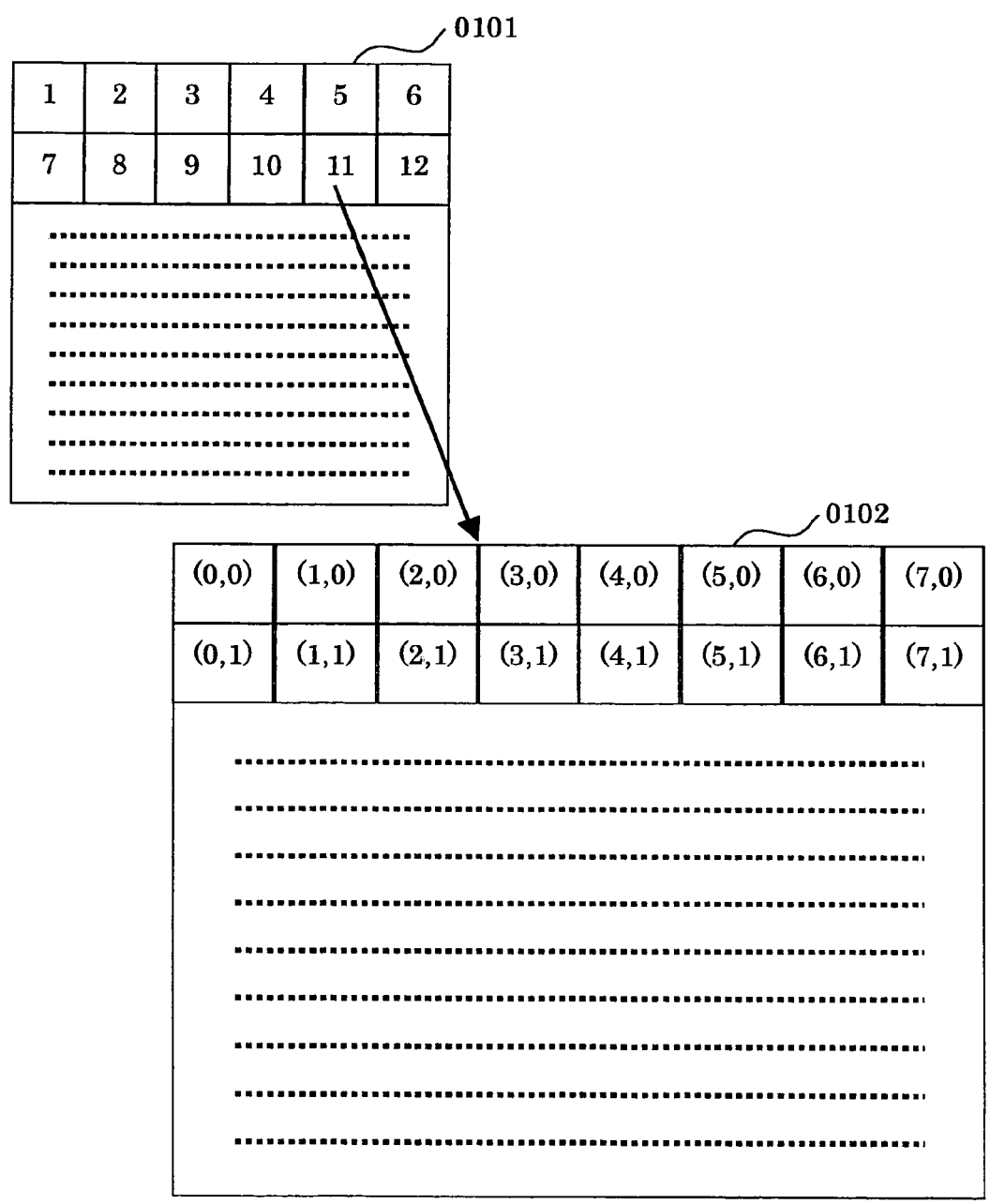
FIG. 1 is a diagram explaining the method of representing image blocks and pixels.

There follows, with reference to FIG. 1, a description of the method whereby the image blocks and pixels which are employed below are represented in the embodiments of the present invention.

The image 0101 is divided into blocks, which are numbered from top left to bottom right.

Each block is m pixels×n pixels in size (where m and n are natural numbers selected at will), and the pixels within a block are represented by coordinates as in block 0102.

Figure 2A:
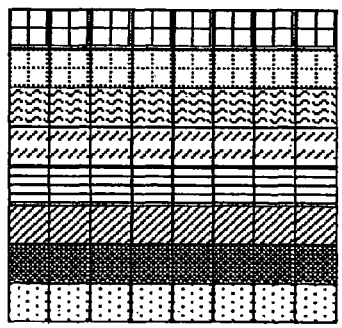
FIG. 2 is a diagram explaining flat blocks.
Figure 2B:
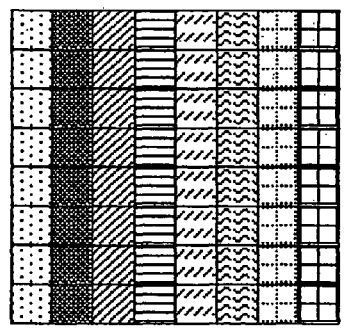
Figure 2C:
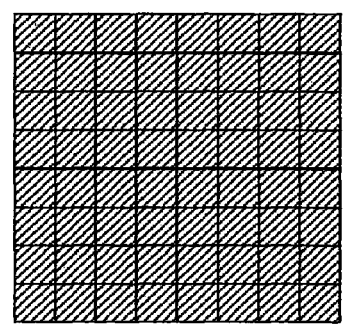

The flat blocks employed below will be defined with the aid of FIG. 2.

A flat block is taken to be a block within which changes in pixel values are small and high-frequency components fewer than the threshold value. A flat block can be determined, for instance, by means of the extent of activity or extent of dispersion of pixel values within it. To be precise, it is possible to assess whether or not a block is a flat block by calculating the activity a or dispersion s of pixels within the block as in Formula 1.

$$\bar{f} = \frac{\sum_{i=0}^{n-1}\sum_{j=0}^{m-1} f(i, j)}{n \times m}$$

$$\sigma = \frac{1}{n \times m - 1} \sum_{i=0}^{n-1}\sum_{j=0}^{m-1} \{f(i, j) - \bar{f}\}^2$$

$$a = \sum_{i=0}^{n-1}\sum_{j=0}^{m-1} \{f(i, j) - \bar{f}\}^2$$

[Formula 1]

f(I, j): Pixel values of pixels (i, j) within the block
/f: Mean pixel value of pixels within the block FIGS. 2(a), (b) and (c) each represent a block. The smaller divisions within the blocks represent pixels. Thus the blocks are 8 pixels×8 pixels in size, but any block of n pixels×m pixels will suffice (where n and m are natural numbers).

The patterns on each of the pixels within a block represent pixel values.

In block (a) all adjacent pixel values in the horizontal direction tally. In block (b) all adjacent pixel values in the vertical direction tally. The definition of the term 'flat block' as used below is a block in which adjacent pixel values in at least either the vertical or horizontal direction tally.

A flat block such as block (c), where all the pixels tally, will be referred to especially as a 'perfect flat block'.

Any block other than a flat block or a perfect flat block will be referred to as a 'general block'.

First Embodiment

Figure 3:
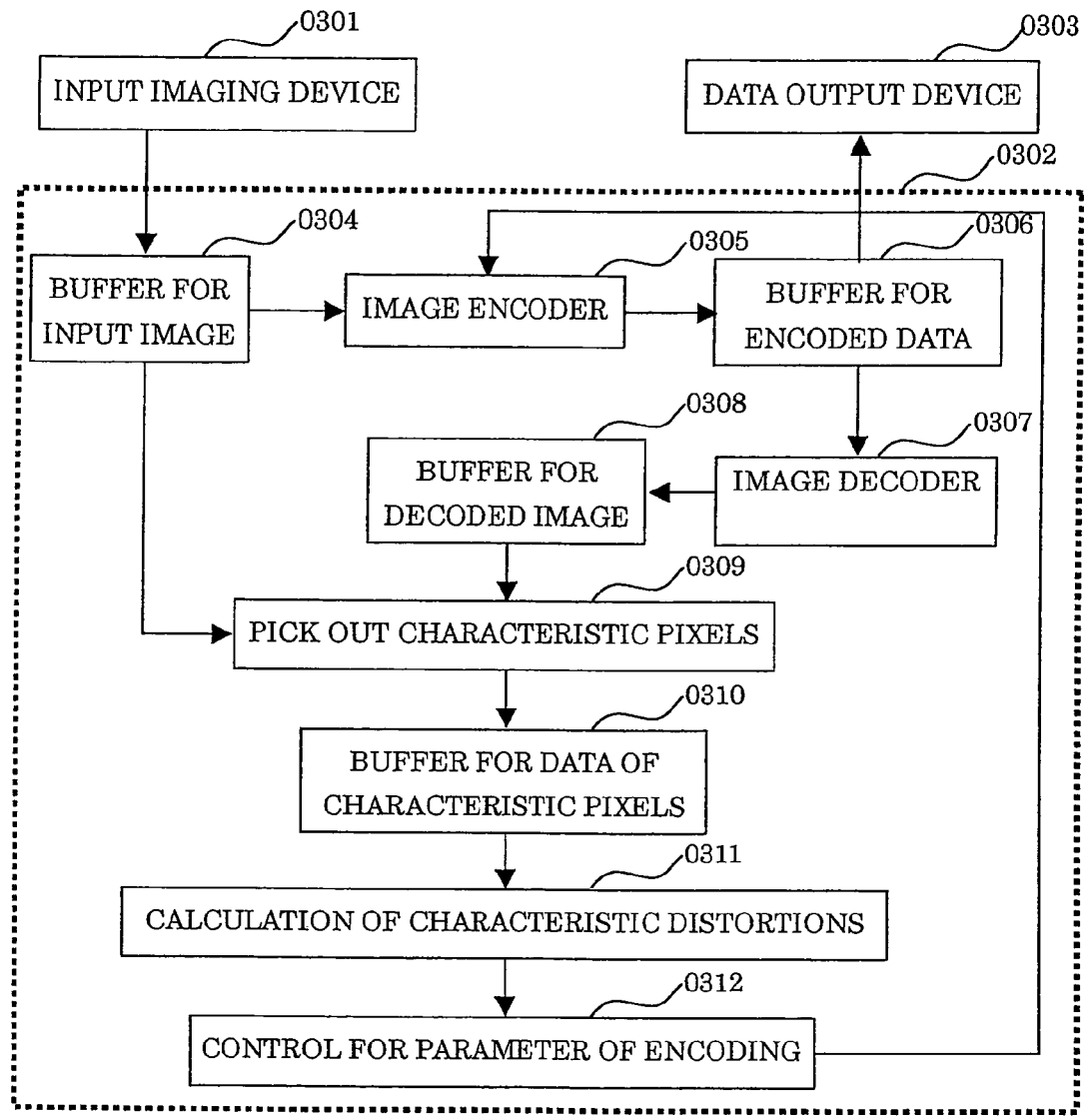
FIG. 3 is a diagram illustrating the configuration of the first embodiment of the image encoding device to which the present invention pertains.

FIG. 3 is a diagram illustrating the configuration of the first embodiment of the image encoding device to which the present invention pertains. An image encoding device 0302 comprises an input image buffer (buffer for input image) 0304, image encoder 0305, encoded data buffer (buffer for encoded data) 0306, image decoder 0307, decoded image buffer (buffer for decoded image) 0308, characteristic pixel extractor (pick out characteristic pixels) 0309, characteristic pixel data buffer (buffer for data of characteristics pixels) 0310, characteristic distortion calculator (calculation of characteristic distortions) 0311 and encoding parameter controller (control for parameter of encoding) 0312. The image encoding device 0302 receives image data from an image input device 0301, and outputs encoded data to a data output device 0303.

The input image buffer 0304 stores input image data input from the input imaging device 0301.

The image encoder 0305 reads input image data from the input image buffer 0304, and outputs encoded data.

The encoded data buffer 0306 stores encoded data output from the image encoder 0305.

The image decoder 0307 reads encoded data from the encoded data buffer 0306, and outputs decoded image data.

The decoded image buffer 0308 stores decoded image data output from the image decoder 0307.

The characteristic pixel extractor 0309 reads input image data and decoded image data from the input image buffer 0304 and decoded image buffer 0308 respectively, extracts characteristic pixels and outputs characteristic pixel data.

Characteristic pixels are pixels which are used to calculate distortion. A characteristic block is a block in which all the pixels are characteristic pixels.

The characteristic pixel data buffer 0310 stores characteristic pixel data output from the characteristic pixel extractor 0309.

The characteristic distortion calculator 0311 reads characteristic pixels from the characteristic pixel data buffer 0310, calculates the characteristic distortion, and outputs the data.

The encoding parameter controller 0312 receives characteristic distortion data output from the characteristic distortion calculator 0311, and decides the parameter values to determine the degree of data compression.

The input image buffer 0304, encoded data buffer 0306, decoded image buffer 0308 and characteristic pixel data buffer 0310 are executed by flash memory, hard disc or other RAM (random excess memory), the image encoder 0305, image decoder 0307, characteristic pixel extractor 0309, characteristic distortion calculator 0311 and encoding parameter controller 0312 by, for instance, independent circuits. They may also be virtual circuits implemented by the processing circuit of a computer or similar device.

The only requirements of the image encoder 0305 and image decoder 0307 are that they constitute an irreversible compression method whereby small area units can be processed at will and the degree of data compression adjusted by parameters.

There follows a description using the JPEG compression method, which is an example of an irreversible compression method.

Figure 4:
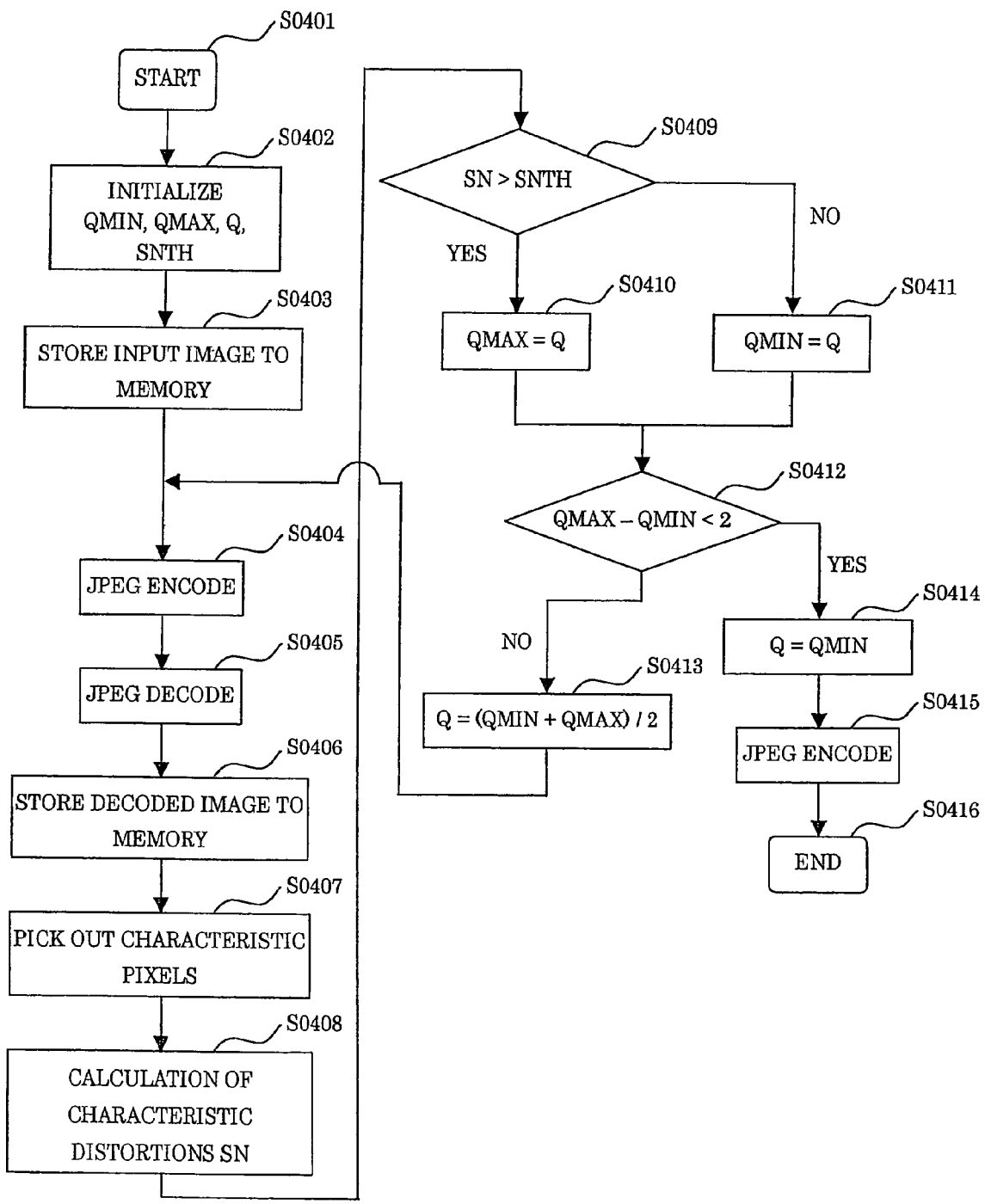
FIG. 4 is a flowchart showing the processing flow in the image encoding device of the first embodiment.

FIG. 4 shows the processing flow in the image encoding device 0302.

In the JPEG compression method, the initial values of the quantisation parameter Q, its maximum and minimum values Qmax and Qmin, and threshold value SNth of the degree of characteristic distortion SN are determined at step S0402.

At step S0403, input image data is stored in the memory so that it may be referred to as necessary. At step S0404 the image encoder 0305 performs JPEG encoding on the input image data using the quantisation parameter Q. At step S0405 the encoded data is decoded, and the resultant decoded image stored in the memory at step S0406 so that it may be referred to as necessary.

At step S0407 the characteristic pixel extractor 0309 searches general blocks which are not flat blocks for input images. If the corresponding decoded image is a flat block, the pixels of the input and decoded images within that block are extracted as characteristic pixels. In other words, the pixels of blocks which as a result of compression have changed from general blocks to flat blocks are extracted as characteristic pixels.

At step S0408 the characteristic distortion calculator 0311 calculates by block unit the dispersion of differences between input image and decoded image for characteristic pixels which have been extracted as represented by formula 2, taking the maximum value as the degree of characteristic distortion SN of that block. It should be noted that SNi of formula 3 may be used instead of SNi of formula 2.

$$diff_i(j, k) = f_i(j, k) - g_i(j, k)$$

$$mean_i = \frac{1}{N}\sum_{j=0}^{7}\sum_{k=0}^{7} diff_i(j, k)$$

$$SN_i = \frac{1}{N-1}\sum_{j=0}^{7}\sum_{k=0}^{7}\{diff_i(j, k) - mean_i\}^2$$

$$SN = \max(SN_i)$$

[Formula 2]

fi(j, k): Pixel values of (j, k) within the ith block of the input image gi(j, k): Pixel values of (j, k) within the ith block of the decoded image $$SN1_i = \frac{1}{N-1}\sum_{j=0}^{7}\sum_{k=0}^{7}\{diff_i(j, k) - mean_i\}$$

[Formula 3]

At step S0409 the encoding parameter controller 0312 assesses whether or not SN is greater than the threshold SNth. If it is, the quantisation parameter Q is substituted for Qmax at step S0410. Otherwise, the value of Q is substituted for Qmin at step S0411, thus narrowing the range of Q. At step S0412 it assesses whether or not convergence has occurred as a result of narrowing the range of the quantisation parameter Q. It assesses whether or not the difference between Qmax and Qmin is smaller than 2. If it is not, they are deemed not to have converged, the quantisation parameter Q is set at the mean value of Qmin and Qmax at step S0403, and the process is repeated at steps S0404 to S0412. If it is smaller than 2, the quantisation parameter Q is deemed to have converged, Qmin is substituted for Q as the optimum value at step S0414, JPEG encoding is performed at step S0415, and the output encoded data is output to the data output device 0303.

It should be added that steps S0412, S0413 and S0414 constitute a binary search to determine the optimum value of the quantisation parameter Q, and this may be replaced by any other search method.

Second Embodiment

The configuration of the image encoding device of the second embodiment is the same as that of the first embodiment depicted in FIG. 3, and will not be described again here.

Figure 5:
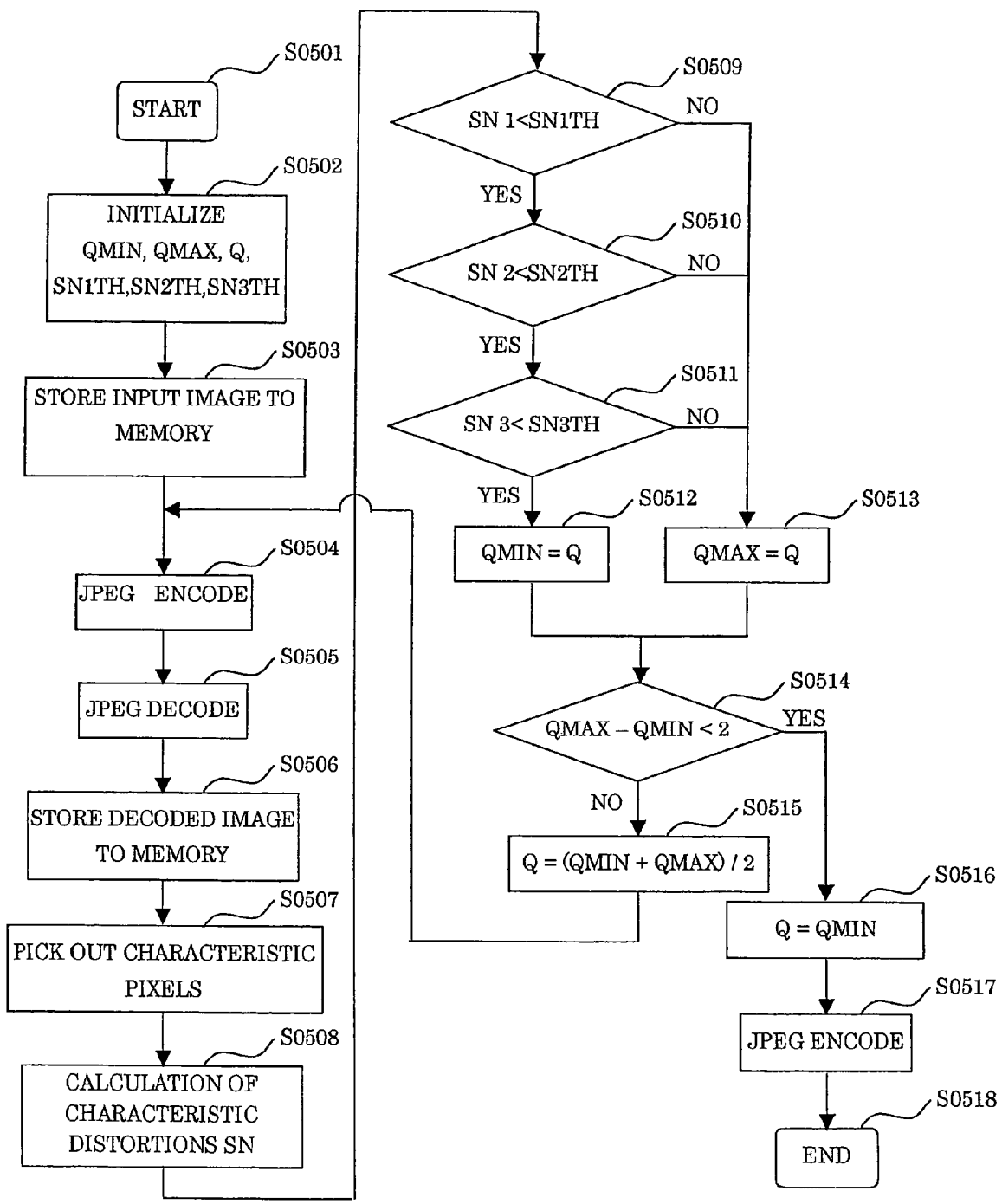
FIG. 5 is a flowchart showing the processing flow in the image encoding device of the second embodiment.

FIG. 5 is a flowchart showing the processing flow of the image encoding device 0302.

The quantisation parameter Q of the JPEG compression method, the initial Qmax and Qmin values, and the degree of characteristic distortion of general blocks and flat blocks other perfect flat blocks are set as SN1, SN2 and SN3, and their respective thresholds as SN1th, SN2th and SN3th at step S0502.

At step S0503, input image data is stored in the memory so that it may be referred to as necessary. At step S0504 the image encoder 0305 performs JPEG encoding on the input image data using the quantisation parameter Q. At step S0505 the encoded data is decoded, and the resultant decoded image stored in the memory at step S0506 so that it may be referred to as necessary.

At step S0507 the characteristic pixel extractor 0309 searches each block of decoded images, classifies them into perfect flat blocks, flat blocks other than perfect flat blocks, and general blocks, and classifies and extracts the pixels of input and decoded images within the blocks.

At step S0508 the characteristic distortion calculator 0311 calculates by block unit the dispersion of differences between input image and decoded image for characteristic pixels which have been classified to perfect flat blocks and extracted as represented by formula 4, taking the maximum value as the degree of characteristic distortion SN1 of perfect flat blocks. The degree of characteristic distortion SN2 of flat blocks other than perfect flat blocks, and the degree of characteristic distortion SN3 of general blocks are calculated in the same manner. It should be noted that SN1i of formula 5 may be used instead of SN1i of formula 4.

$$diff_i(j, k) = f_i(j, k) - g_i(j, k)$$

$$mean_i = \frac{1}{N}\sum_{j=0}^{7}\sum_{k=0}^{7} diff_i(j, k)$$

$$SN1_i = \frac{1}{N-1}\sum_{j=0}^{7}\sum_{k=0}^{7}\{diff_i(j, k) - mean_i\}^2$$

$$SN1 = \max(SN1_i)$$

[Formula 4]

fi(j, k): Pixel values of (j, k) within the ith block of the input image gi(j, k): Pixel values of (j, k) within the ith block of the decoded image $$SN1_i = \frac{1}{N-1}\sum_{j=0}^{7}\sum_{k=0}^{7}\{diff_i(j, k) - mean_i\}$$

[Formula 5]

At steps S0509, S0510 and S0511 the encoding parameter controller 0312 assesses whether or not SN1, SN2 and SN3 are greater than the respective thresholds SN1th, SN2th and SN3th. If they all are, the quantisation parameter Q is substituted for Qmin at step S0512. Otherwise, the value of Q is substituted for Qmax at step S0513, thus narrowing the range of Q. At step S 0514 it assesses whether or not convergence has occurred as a result of narrowing the range of the quantisation parameter Q. It assesses whether or not the difference between Qmax and Qmin is smaller than 2. If it is not, they are deemed not to have converged, the quantisation parameter Q is set at the mean value of Qmin and Qmax at step S0515, and the process is repeated at steps S0504 to S0414. If it is smaller than 2, the quantisation parameter Q is deemed to have converged, Qmin is substituted for Q as the optimum value at step S0516, JPEG encoding is performed at step S0517, and the output encoded data is output to the data output device 0303.

It should be added that steps S0514, S0515 and S0516 constitute a binary search to determine the optimum value of the quantisation parameter Q, and this may be replaced by any other search method.

Third Embodiment

Figure 6:
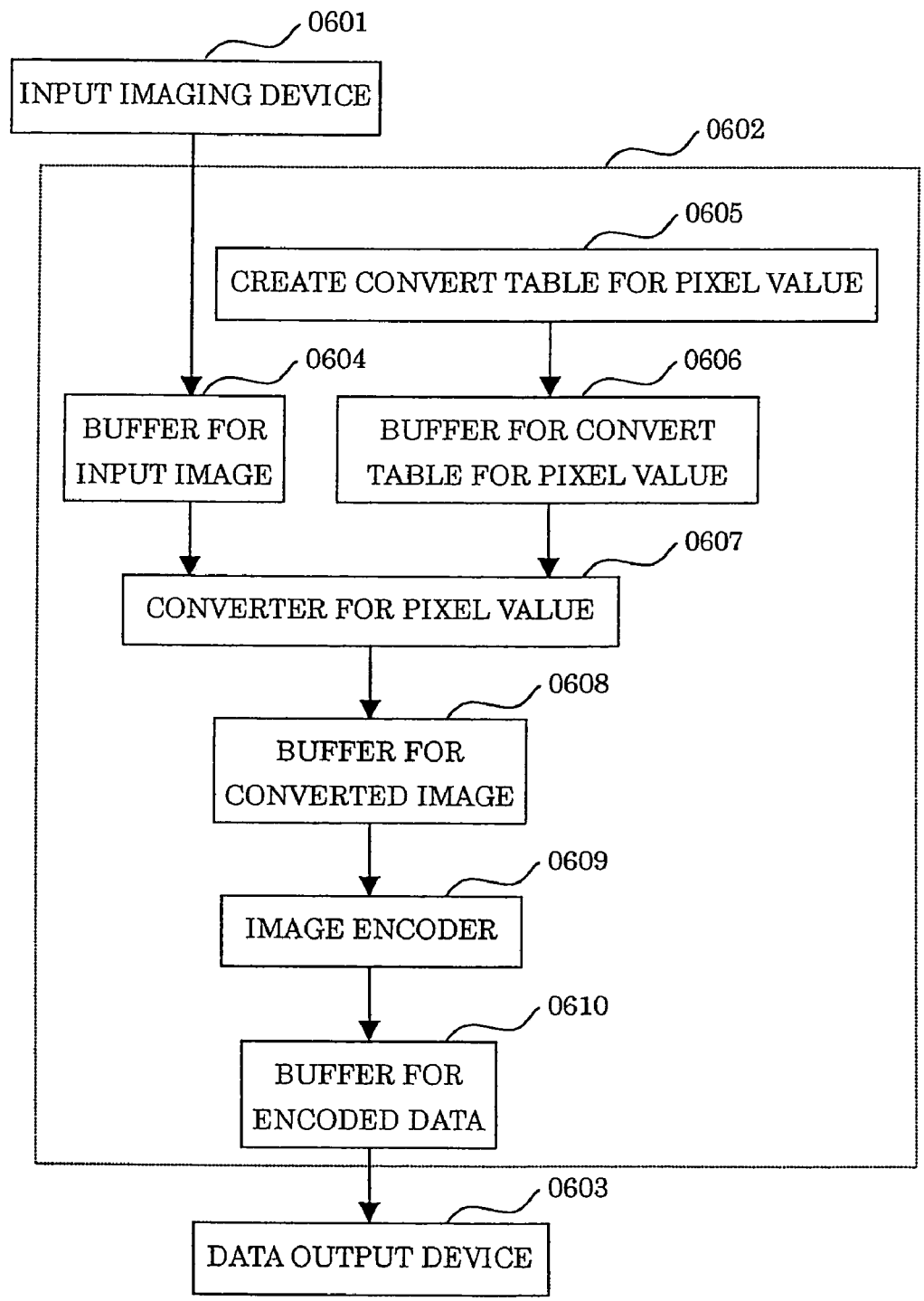
FIG. 6 is a flowchart showing the processing flow in the image encoding device of the third embodiment.
Figure 7:
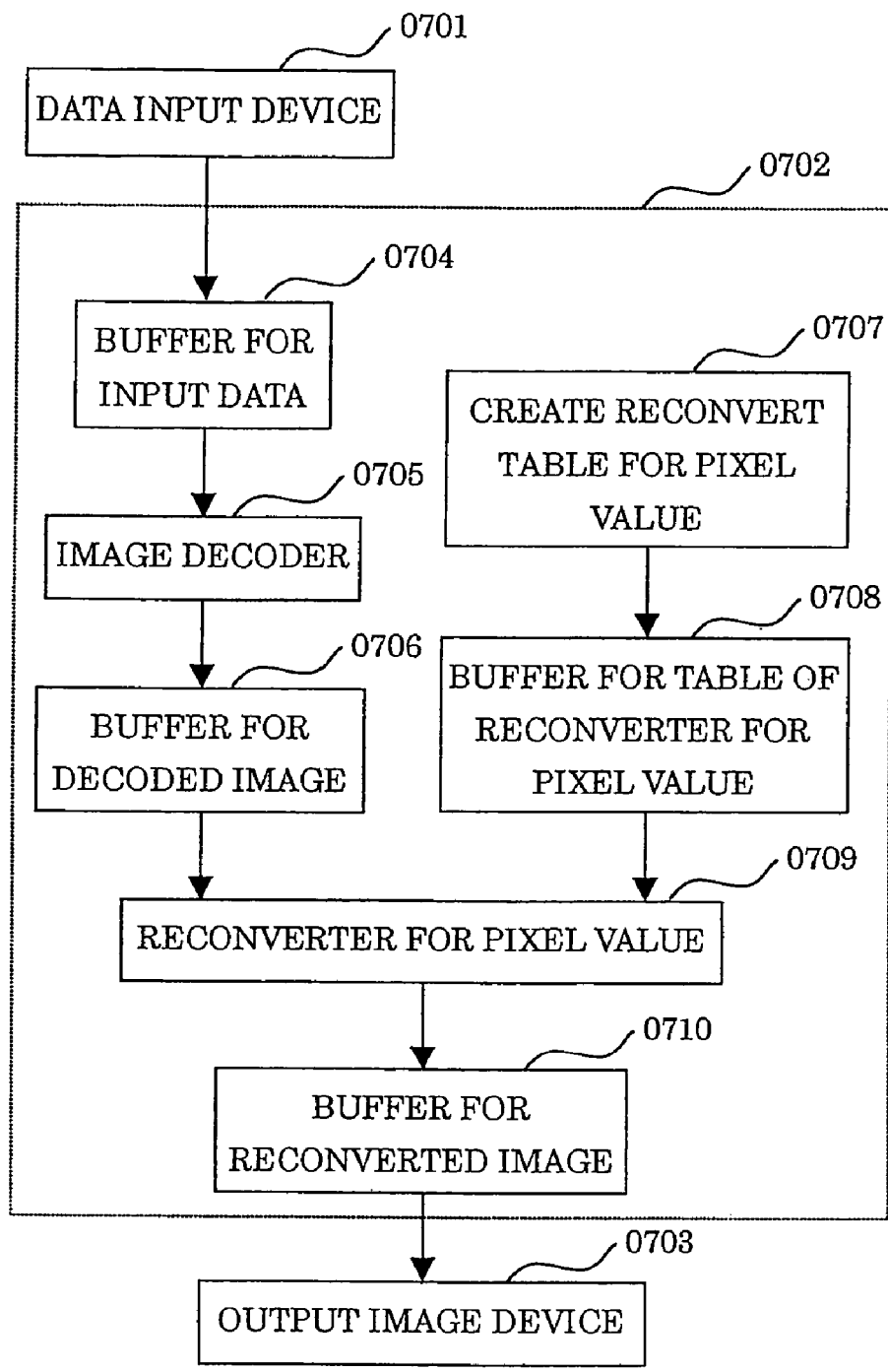
FIG. 7 is a flowchart showing the processing flow in the image decoding device of the third embodiment.

FIGS. 6 and 7 are diagrams illustrating respectively the configurations of the image encoding device and image decoding device to which the present invention pertains.

The image encoding device 0602 comprises an input image buffer (buffer for input image) 0604, pixel value conversion table creator (create convert table for pixel value) 0605, pixel value conversion table buffer (buffer for convert table for pixel value) 0606, pixel value converter (converter for pixel value) 0607, pixel value converted image buffer (buffer for converted value) 0608, image encoder 0609 and encoded data buffer (buffer for encoded data) 0610. Image data is received from the image input device 0601, and encoded data is output to the data output device.

The image decoding device 0702 comprises an input data buffer (buffer for input data) 0704, image decoder 0705, decoded image buffer (buffer for decoded image) 0706, pixel value reconversion table creator (create reconvert table for pixel value) 0707, pixel value reconversion table buffer (buffer for table of reconverter for pixel value) 0708, pixel value reconverter (reconverter for pixel value) 0709 and pixel value reconverted image buffer (buffer for reconverted image) 0710. Encoded data is received from the data input device 0701, and the reconverted image output to the image output device (output image device) 0703.

There follows a description of each part of the image encoding device 0602.

The input image buffer 0604 stores input image data input from the image input device 0601.

The pixel value conversion table creator 0605 creates pixel value conversion table data (explained below with reference to FIGS. 8 and 9).

The pixel value conversion table buffer 0606 stores pixel value conversion table data output from the pixel value conversion table creator 0605.

The pixel value converter 0607 reads input image data and pixel value conversion table data from the input image buffer 0604 and pixel value conversion table buffer 0606 respectively, converts pixel values of the input images, and outputs pixel value converted image data.

The pixel value converted image buffer 0608 stores pixel value converted image data output from the pixel value converter 0607.

The image encoder 0609 reads pixel value converted image data from the pixel value converted image buffer 0608, encodes and outputs the encoded data.

The encoded data buffer 0610 stores encoded data output from the image encoder 0609.

There follows an explanation of the parts of the image decoding device 0702.

The input data buffer 0704 stores input encoded data input from the data input device 0701.

The image decoder 0705 reads input encoded data from the input data buffer 0704, decodes and outputs decoded image data.

The decoded image buffer 0706 stores decoded image data output from the image decoder 0705.

The pixel value reconversion table creator 0707 creates and outputs pixel value reconversion table data.

The pixel value reconversion table buffer 0708 stores pixel value reconversion table data output from the pixel value reconversion table creator 0707.

The pixel value reconverter 0709 inputs decoded image data and pixel value reconversion table data from the decoded image buffer 0706 and pixel value reconversion table buffer 0708 respectively, reconverts pixel values and outputs pixel value reconverted images.

The pixel value reconverted image buffer 0710 stores pixel value reconverted image data output from the pixel value reconverter 0709.

The input image buffer 0604, pixel value conversion table buffer 0606, pixel value converted image buffer 0608, encoded data buffer 0610, input data buffer 0704, decoded image buffer 0706, pixel value reconversion table buffer 0708 and pixel value reconverted image buffer 0710 are executed by flash memory, hard disc or other RAM (random access memory), the pixel value conversion table creator 0605, pixel value converter 0607, image encoder 0609, image decoder 0705, pixel value reconversion table creator 0707 and pixel value reconverter 0709 by, for instance, independent circuits. They may also be virtual circuits implemented by the processing circuit of a computer or similar device.

The pixel value conversion table and pixel value reconversion table used below are created respectively from a pixel value conversion function and a pixel value reconversion function. The pixel value conversion function may be linear or non-linear, and the pixel value reconversion function is basically the pixel value conversion function reversed (for x=y).

Figure 8A:
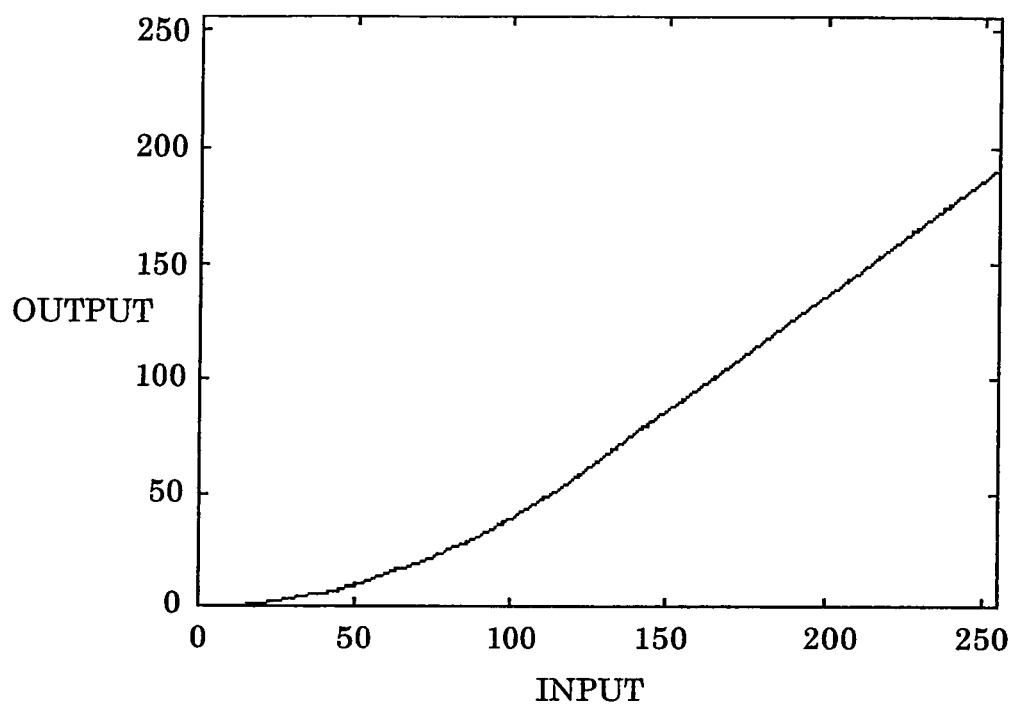
FIG. 8 is a diagram illustrating pixel value conversion function and a diagram illustrating pixel value reconversion function in the third embodiment.
Figure 8B:
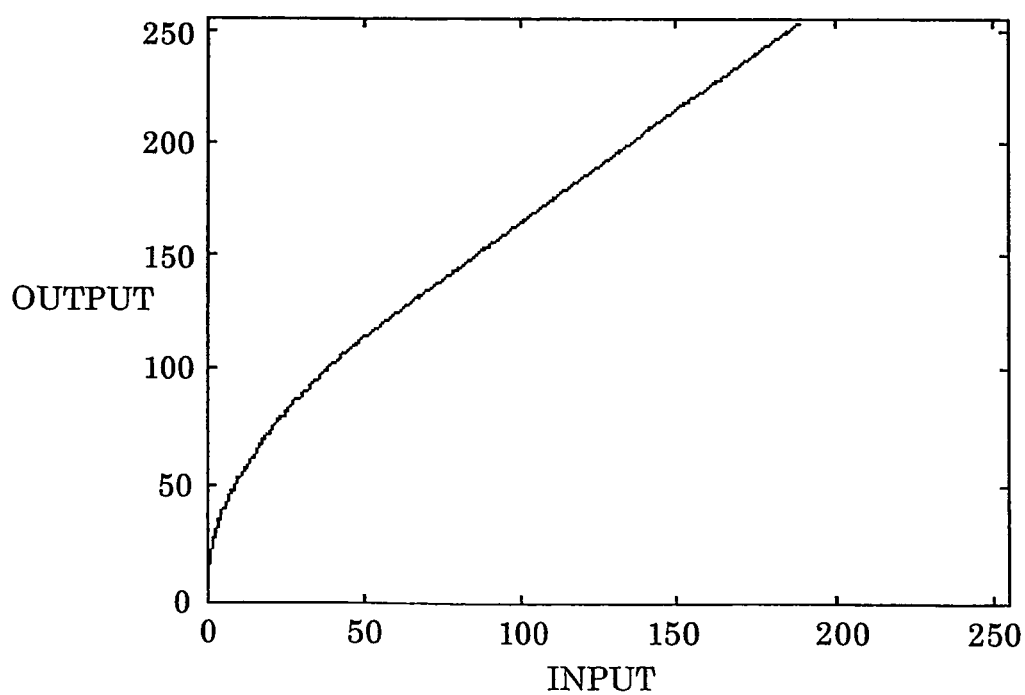

FIG. 8 illustrates an example of a combination of pixel value conversion function and pixel value reconversion function, where FIG. 8A is the pixel value conversion function and FIG. 8B is the pixel value reconversion function.

The pixel value conversion function (a) combines the region where the slope of the gamma curve is 1 or less ($\gamma<1$) and a straight line of slope 1, and utilises the characteristics of the display terminal etc. effectively to reduce the dynamic range of the low-pixel region. The pixel value reconversion function (b) is the reverse of the pixel value conversion function (a). The pixel value conversion table on FIG. 9 is obtained from the pixel value conversion function (a).

It will be seen that thanks to the pixel value conversion table the total pixel value region is reduced from 0-255 to 0-191.

In the pixel value reverse function table the input and output of the pixel value conversion table are exchanged. It should be added that the pixel value conversion function can be selected at will, and the corresponding pixel value reconversion function is basically the opposite of the pixel value conversion function, but may be modified in order to increase brightness, eliminate noise or for other reasons.

Figure 10:
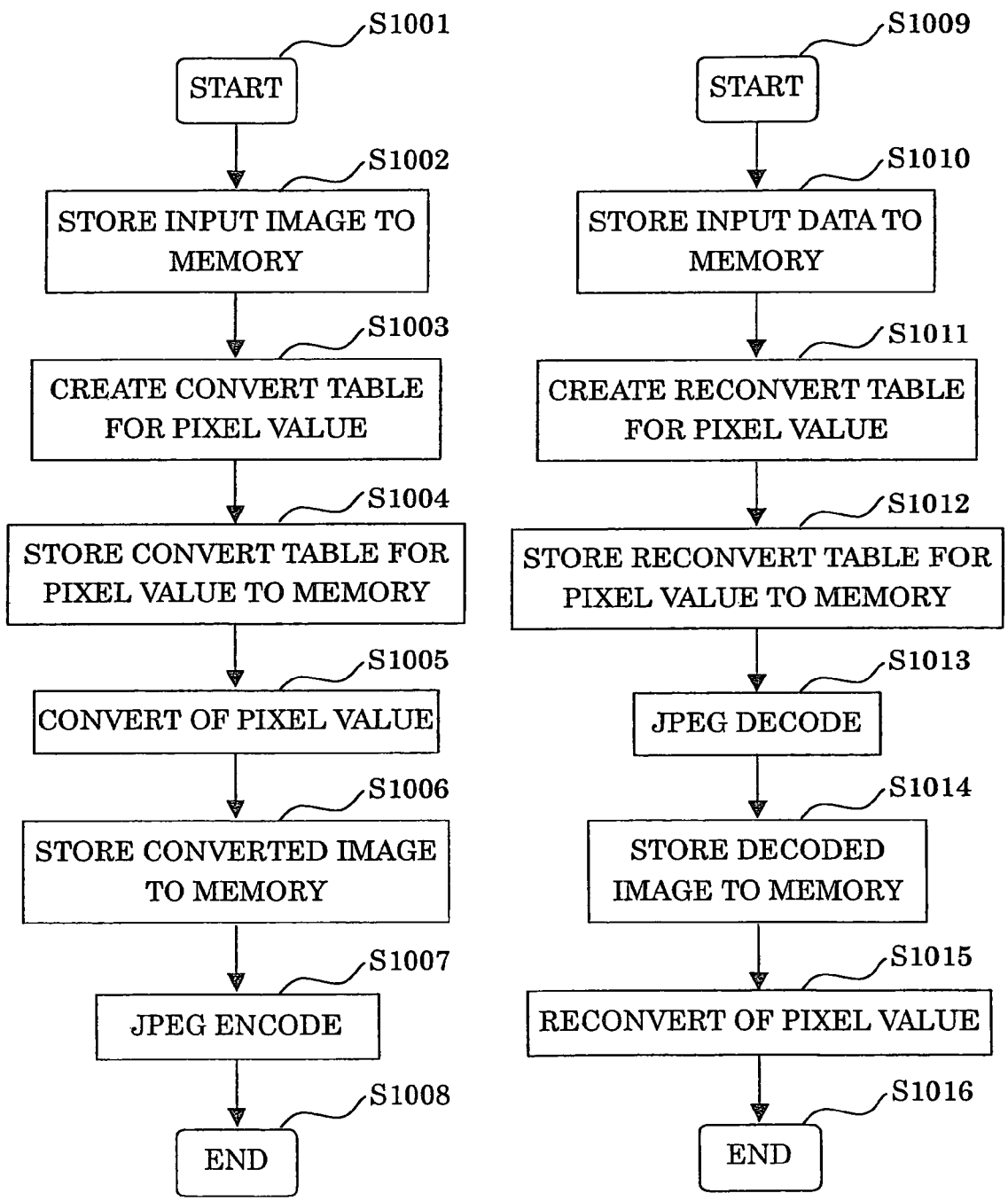
FIG. 10 is a flowchart showing the processing flow in the image encoding device of the third embodiment and a flowchart showing the processing flow in the image decoding device of the third embodiment.

FIG. 10 shows the processing flow of the image encoding device 0602.

There follows an explanation of the processing flow of the image encoding device 0602.

At step S1002 the input image data is stored in the memory so that it can be referred to if required.

At step S1003 the pixel value conversion table creator 0605 creates a pixel value conversion table from the pixel value conversion function. At step S1004 pixel value conversion table data is stored in the memory so that it can be referred to if required.

At step S1005 the pixel value converter 0607 converts the pixel values of the input image data in accordance with the pixel value conversion table data, and at step S1006 the pixel value converted image is stored in the memory.

At step S1007 the image encoder 0609 reads the pixel value converted image within the memory, performs JPEG encoding and outputs the encoded data to the data output device 0603.

FIG. 10 also shows the processing flow of the image decoding device 0702.

There follows an explanation of the processing flow of the image decoding device 0702.

At step S1010 input encoded data is stored in the memory from the data input device 0701.

At step S1011 the pixel value reconversion table creator 0707 creates a pixel value reconversion table, and at step S1012 the pixel value reconversion table is stored in the memory.

At step S1013 JPEG decoding is implemented in the image decoder 0705, and the decoded image stored in the memory at step S1014.

At step S1015 the pixel value reconverter 0709 reads decoded image and the pixel value reconversion table from the memory and outputs the pixel value reconversion image as a reconverted image from the image output device 0703.

Fourth Embodiment

Figure 11:
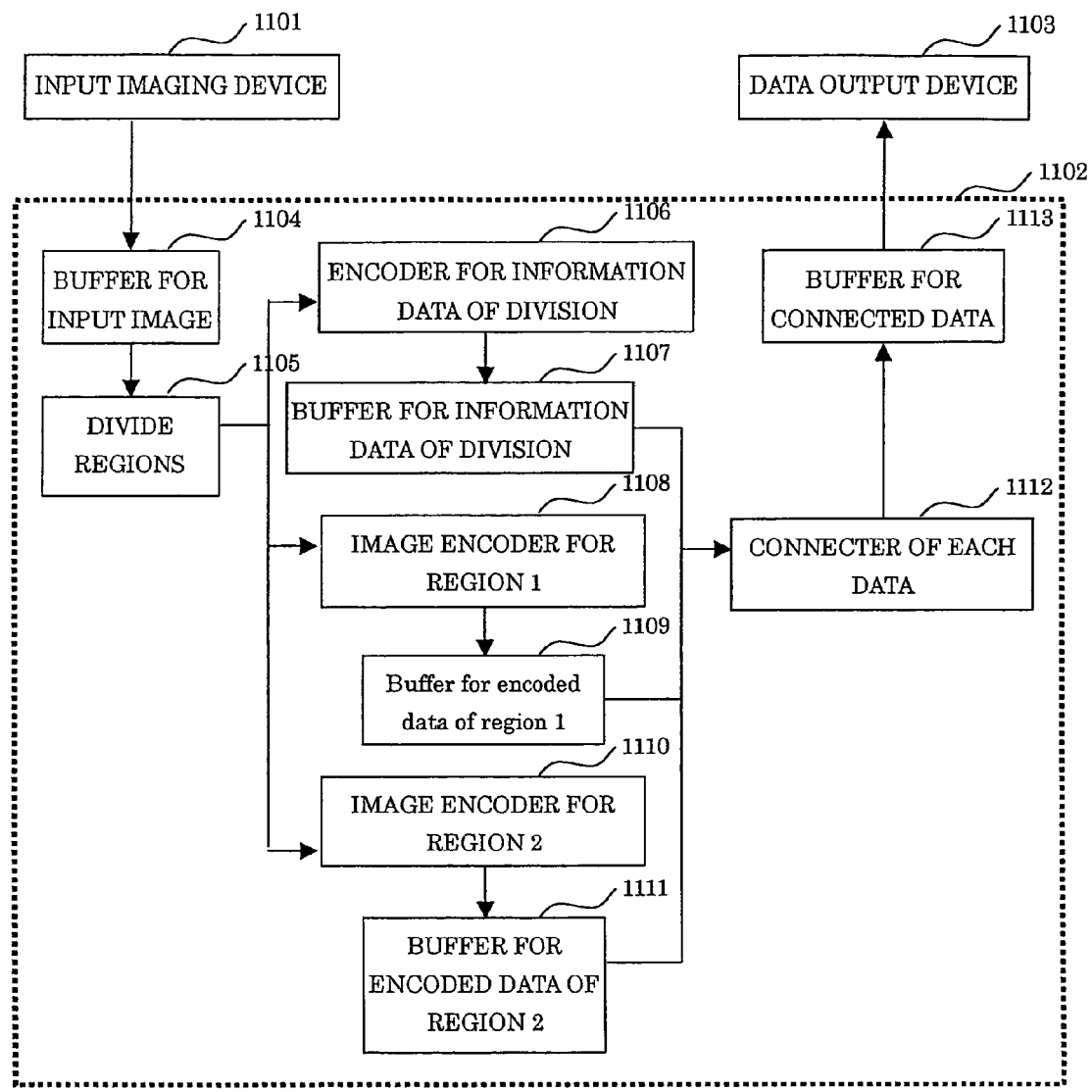
FIG. 11 is a flowchart showing the processing flow in the image encoding device of the fourth embodiment.
Figure 12:
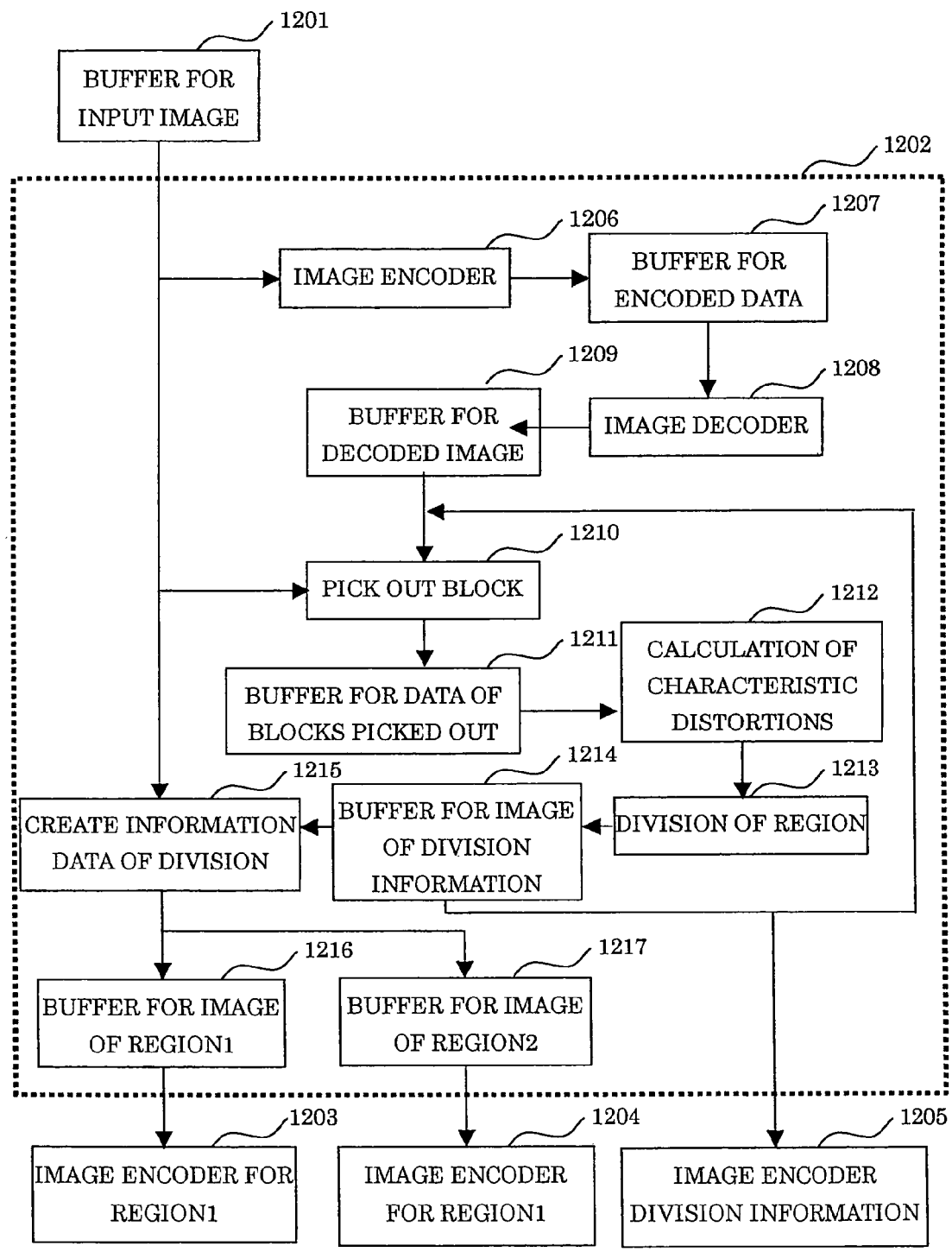
FIG. 12 is a diagram illustrating the detailed configuration of the region divider in the fourth embodiment.

FIGS. 11 and 12 are diagram illustrating the configuration of the image encoding device to which the present invention pertains.

The input image buffer 1104 is the same as the input image buffer 1201, the region-divided image encoding device 1106 as the region-divided image encoder 1205, the region 1 image encoder device 1108 as the region 1 image encoder 1203, and the region 2 image encoder 1110 as the region 2 image encoder 1204.

The image encoder 1102 reads input images from the image input device 1101 and outputs combined encoded data to the data output device 1103.

The image encoder 1102 comprises an input image buffer 1104 (1201), region divider 1105, region-divided image encoder 1106 (1205), region-divided encoded data buffer 1107, region 1 image encoder 1108 (1203), region 1 encoded data buffer 1109, region 2 image encoder 1110 (1204), region 2 encoded data buffer 1111, encoded data combiner 1112 and combined encoded data buffer 1113.

FIG. 12 illustrates the configuration of the region divider 1105. The region divider 1105 of FIG. 11 corresponds in FIG. 12 to the region divider 1202, The region divider 1105 (1202) comprises an image encoder 1206, encoded data buffer 1207, image decoder 1208, decoded image buffer 1209, block extractor 1210, extracted block data buffer 1211, characteristic distortion calculator 1212, region divider 1213, region-divided image buffer 1214, region image creator 1215, region 1 image buffer 1216 and region 2 image buffer 1217.

The input image buffer 1104 stores input image data input from the image input device 1101.

The image encoder 1206 receives input image data from the input image buffer 1104 (1201), encodes and writes the encoded data to the encoded data buffer 1207.

The image decoder 1208 reads decoded image data from the encoded data buffer 1207, decodes and writes the decoded image to the decoded image buffer 1209.

The block extractor 1210 reads input image data from the input image buffer 1104 (1201) and decoded image data from the decoded image buffer, extracts pixels from within the block and writes the extracted pixels to the extracted block data buffer 1211. The characteristic distortion calculator 1212 reads extracted block data from the extracted block data buffer 1211, calculates characteristic distortion and outputs the characteristic distortion data.

The region divider 1213 divides regions in accordance with the size of the characteristic distortion data, and writes the region-divided image data to the region-divided image buffer 1214.

The region image creator 1215 reads region-divided image data and input image data from the region-divided image buffer 1214 and input image buffer 1201 respectively, creates region 1 image data and region 2 image data in accordance with the region-divided image data, and writes them to the region 1 image buffer 1216 and region 2 image buffer 1217 respectively.

The region-divided image encoder 1106 (1205) reads region-divided image data from the region-divided image buffer 1214, encodes and writes the encoded data as region-divided image encoded data to the region-divided encoded data buffer 1107.

The region 1 image encoder 1108 (1203) reads region 1 image data from the region 1 image buffer 1216, encodes and writes the encoded data as region 1 encoded data to the region 1 encoded data buffer 1109.

The region 2 image encoder 1110 (1204) reads region 2 image data from the region 2 image buffer 1217, encodes and writes the encoded data as region 2 encoded data to the region 2 encoded data buffer 1111.

The encoded data combiner 1112 reads region-divided image encoded data, region 1 encoded data and region 2 encoded data from the region-divided encoded data buffer 1107, region 1 encoded data buffer 1109 and region 2 encoded data buffer 1111, combines the three into one, creates combined encoded data, writes it to the combined encoded data buffer 1113, and outputs to the data output device 1103.

Figure 13:
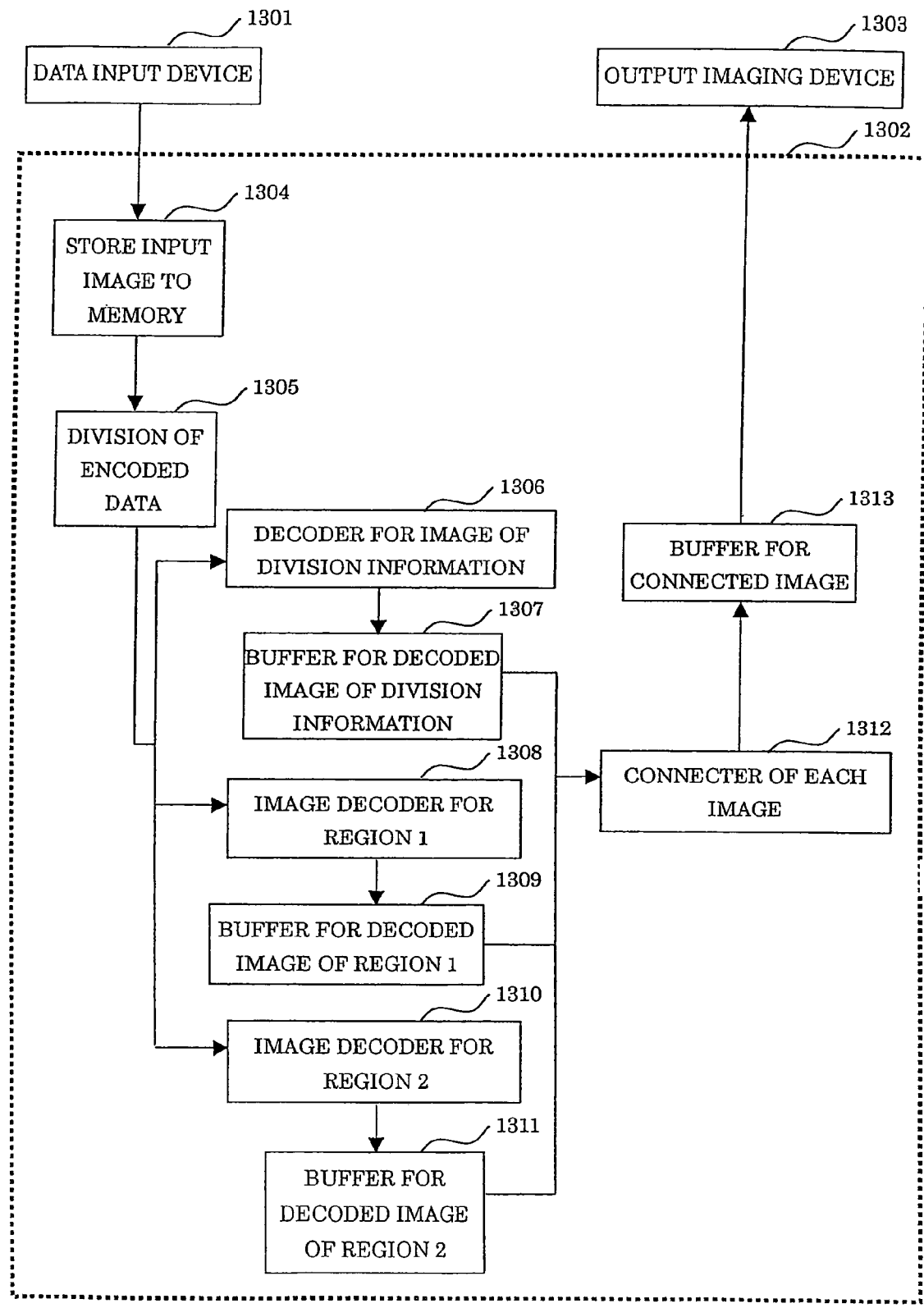
FIG. 13 is a diagram illustrating the configuration of the image decoding device of the fourth embodiment.

FIG. 13 is a diagram illustrating the configuration of the image decoding device to which the present invention pertains.

The image decoding device 1302 comprises an input data buffer 1304, encoded data divider 1305, region-divided image decoder 1306, region 1 image decoder 1308, region 2 image decoder 1310, region-divided decoded image buffer 1307, region 1 decoded image buffer 1309, region 2 decoded image buffer 1311, decoded image data combiner 1312 and combined decoded image buffer 1313. It receives encoded data from the data input device 1301, and outputs combined decoded image data to the image output device 1303.

The input data buffer 1304 stores input data input from the data input device 1301.

The encoded data divider 1305 reads input data from the input data buffer 1304, divides it into region-divided image encoded data, region 1 image encoded data and region 2 image encoded data, and outputs to the region-divided image decoder 1306, region 1 image decoder 1308 and region 2 image decoder respectively.

The region-divided image decoder 1306 receives region-divided image encoded data from the encoded data divider 1305, decodes and writes the resultant decoded image as a region-divided decoded image to the region-divided decoded image buffer 1307.

The region 1 image decoder 1308 receives region 1 image encoded data from the encoded data divider 1305, decodes and writes the resultant decoded image as a region 1 decoded image to the region 1 decoded image buffer 1309.

The region 2 image decoder 1310 receives region 2 image encoded data from the encoded data divider 1305, decodes and writes the resultant decoded image as a region 2 decoded image to the region 2 decoded image buffer 1311.

The decoded image data combiner 1312 reads region-divided decoded image data, region 1 decoded image data and region 2 decoded image data from the region-divided decoded image buffer 1307, region 1 decoded image buffer 1309 and region 2 decoded image buffer 1311 respectively, combines and writes them as combined decoded image data to the combined decoded image buffer 1313, and outputs to the image output device 1303.

The input image buffer 1104 (1201), region-divided encoded data buffer 1107, region 1 encoded data buffer 1109, region 2 encoded data buffer 1111, combined encoded data buffer 1113, encoded data buffer 1207, decoded image buffer 1209, extracted block data buffer 1211, region-divided image buffer 1214, region 1 image buffer 1216, region 2 image buffer 1217, input data buffer 1304, region-divided decoded image buffer 1307, region 1 decoded image buffer 1309, region 2 decoded image buffer 1311 and combined decoded image buffer 1313 are executed by flash memory, hard disc or other RAM (random access memory), the region-divided image encoder 1106 (1205), region 1 image encoder 1108 (1203), region 2 image encoder 1110 (1204), encoded data combined 1112, image encoder 1206, image decoder 1208, block extractor 1210, characteristic distortion calculator 1212, region divider 1213, region image creator 1215, encoded data divider 1305, region-divided image decoding device 1306, region 1 image decoding device 1308, region 2 image decoding device 1310 and decoded image data combiner 1312 by, for instance, independent circuits. They may also be virtual circuits implemented by the processing circuit of a computer or similar device.

Figure 18:
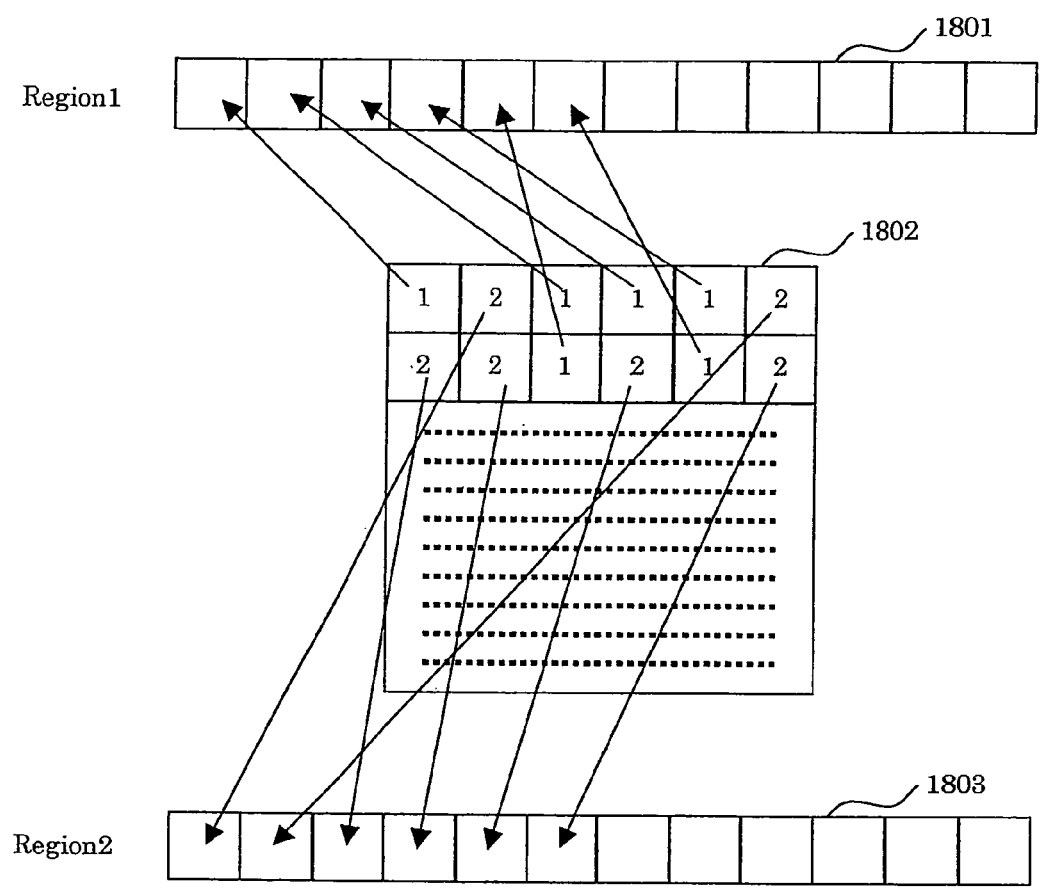
FIG. 18 is a diagram explaining the processing which is executed in the region image creator in the fourth embodiment.

The processing which is performed by the region image creator 1215 may for instance be as illustrated in FIG. 18, where each block of input images 1802 is assessed to determine which region it belongs to, and the blocks are copied in numerical order to create a region 1 image 1801 and region 2 image 1803. The decoded image data combiner 1312 may perform the opposite operation in accordance with region-divided decoded images. In this manner, region-divided images may include data other than images provided they are such that it is clear what block of input images each block of region images corresponds to.

The number of divisions is here two, but there is no limit.

The region-divided image decoder 1306, region 1 image decoder 1308 and region 2 image decoder 1310 must be able to decode region-divided image encoded data, region 1 encoded data and region 2 encoded data respectively.

The region 1 image encoding device 1108 and image encoder 1206 must employ the same image encoding method. That image encoding method may be any provided that it is a reversible compression method which permits processing in small region units as for instance the JPEG compression method.

The region-divided image encoding device 1106 may employ any reversible encoding method.

Image encoding of regions other than region 1 may employ any encoding method which is capable of guaranteeing picture the desired quality suited.

Combined encoded data created by the encoded data combiner 1112 is a combination of divided encoded data and encoded data for each region, and therefore may be in any form provided that it contains sufficient information to allow it to be divided into the original divided encoded data and encoded data for each region. For example, as may be seen from FIG. 17, it may have information on the volume of each set of encoded data along with the vertical and horizontal size of the input image in the header, while the body includes the original encoded data.

The region 1 image encoder 1108 and region 2 image encoder 1110 need only be capable of encoding the parameters required for encoding with certain values. They may also have characteristics other than encoding, such as optimising the parameters required for encoding like the image encoders described in the first and second embodiments, or processing the image prior to encoding like the image encoding device described in the third embodiment.

In the explanation which follows, the region-divided image encoder 1106, region 2 image encoder 1110, region-divided image decoder 1306 and region 1 image decoding device 1310 employ the Huffman encoding method, the region 1 image encoder 1108 is the image encoder 0302 employing the JPEG compression method described in the second embodiment, and the region 1 image decoder 1308 employs the JPEG compression method.

Figure 14:
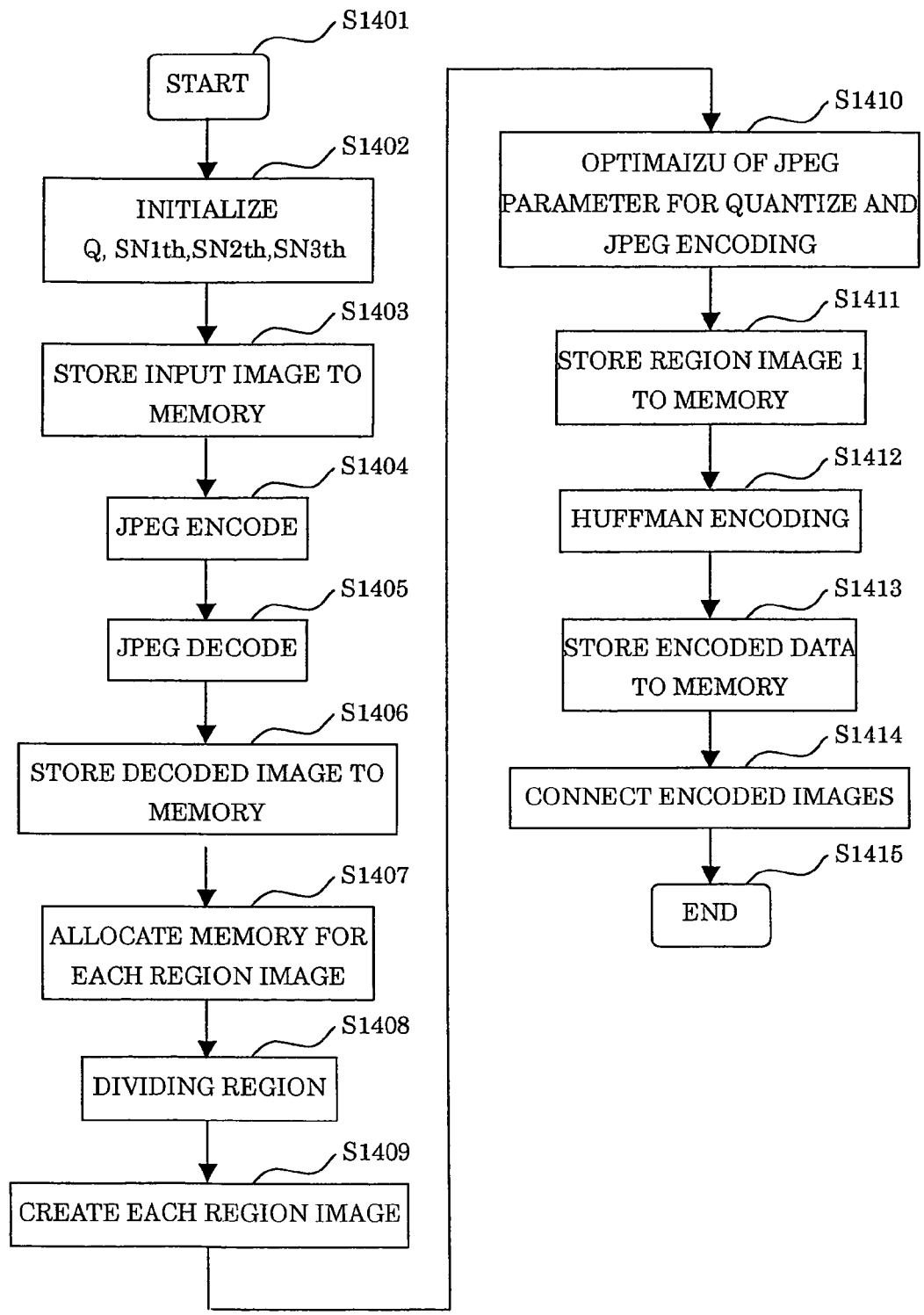
FIG. 14 is a flowchart showing the processing flow in the image encoding device of the fourth embodiment.

FIG. 14 shows the processing flow of the image encoding device 1102.

At step S1402 the quantisation parameter Q of the JPEG compression method and the threshold values SN1th, SN2th, SN3th of the characteristic distortion SN of the perfect flat block, flat block and general block are set.

At step S1403 the image input from the image input device 1101 is stored in the input image buffer 1104 (1201).

At step S1404 the image encoder 1206 performs JPEG encoding with the quantisation parameter Q, and at step S1405 the image decoder 1208 decodes the data encoded at step S1404.

At step S1406 the decoded image data is stored in the decoded image buffer 1209.

At step S1407 region-divided image memory is secured for a number of pixels vertically and horizontally corresponding to the total number of blocks vertical and horizontal when the input image was divided into blocks (8×8 pixels).

Figure 15:
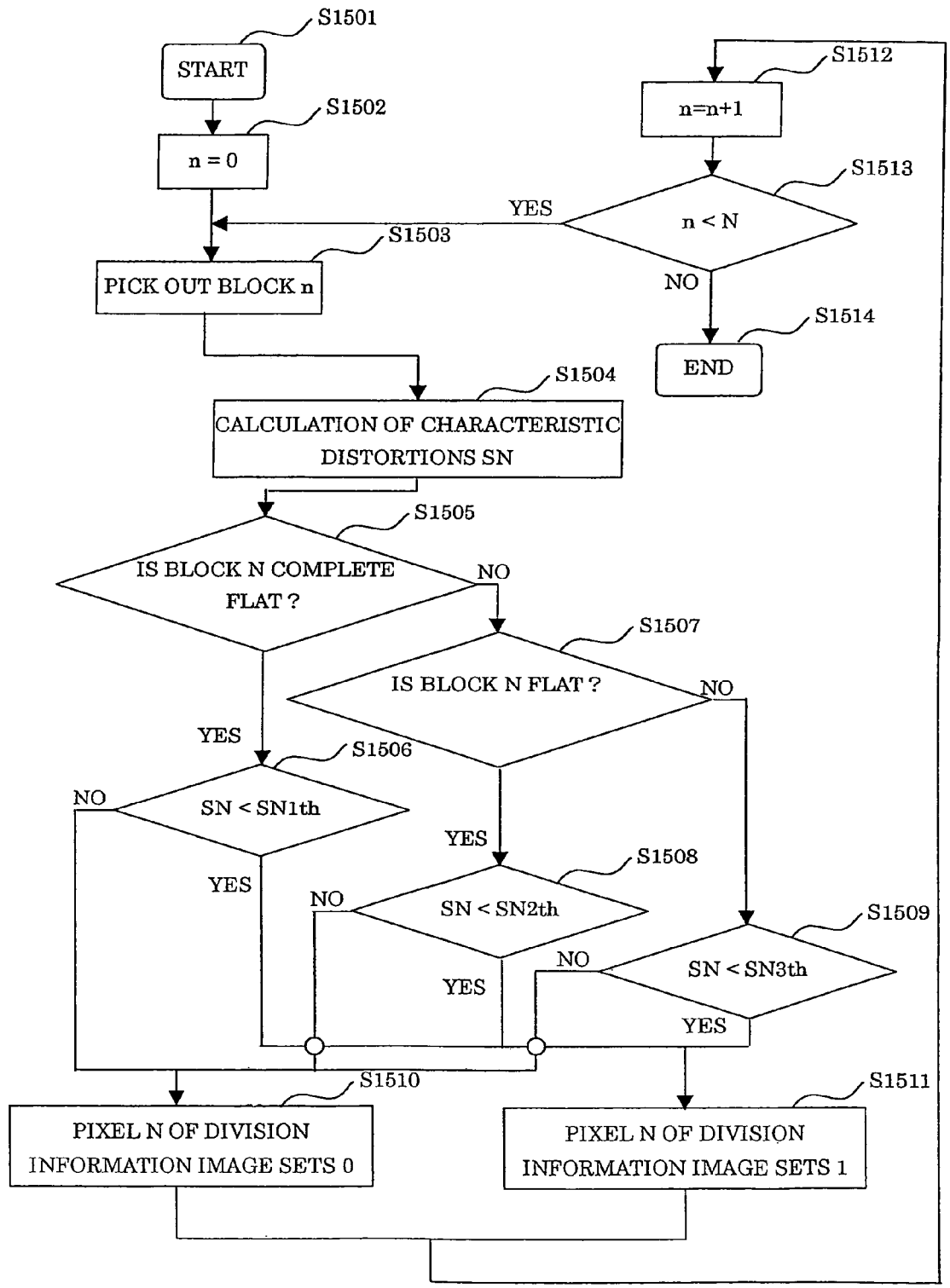
FIG. 15 is a flowchart showing the detailed processing flow in the region divider in the fourth embodiment.

At step S1408 region division is implemented, and details of the processing flow are shown in FIG. 15.

At step S1502 0 is substituted for n, which denotes the number of the block.

At step S1503 the block extractor 1210 extracts the nth block of input image data and decoded image data and stores the pixel values of the block in the extracted block data buffer 1211.

At step S1504 the characteristic distortion calculator 1212 calculates the characteristic distortion SN represented by formula 6 of the nth block.

$$diff_i(j, k) = f_i(j, k) - g_i(j, k) \qquad \text{[Formula 6]}$$

$$\text{mean}_i = \frac{1}{N} \sum_{j=0}^{7} \sum_{k=0}^{7} diff_i(j, k)$$

$$SN = \frac{1}{N-1} \sum_{j=0}^{7} \sum_{k=0}^{7} \{diff_i(j, k) - \text{mean}_i\}^2$$

fi(j, k): Pixel values of (j, k) within the ith block of the input image gi(j, k): Pixel values of (j, k) within the ith block of the decoded image At steps S1505 and S1507 the region divider 1213 divides the nth block of decoded images according as to whether it is a perfect flat block, a flat block other than a perfect flat block, or a general block.

At either of steps S1506, S1508 or S1510 it is evaluated by the threshold value of characteristic distortion corresponding to the type of block. If it is smaller than the threshold value, it becomes region 1 for encoding by the JPEG method, and the nth pixel value of the region-divided image becomes 0 at step S1510. If it is greater than the threshold value, it becomes region 2 for encoding by the Huffman method, and at step S1511 the nth pixel value of the region-divided image becomes 1 and is written to the region-divided image buffer 1214.

At step S1512, n is incremented and changed to the number of the next block.

At step S1513 the number n of the block is compared with the total number N of blocks to assess whether or not evaluation of all the blocks is complete.

Steps S1503 to S1513 are repeated until region division of the whole block is complete. The region image creator 1215 implements step S1409, and the region-divided image is utilised to create region 1 image data wherein blocks of input image of region 1 are arranged in a row horizontally and region 2 image data wherein blocks of input image of region 2 are arranged in a row horizontally as shown in FIG. 18.

At step S1410 the region 1 image encoding device 1108 optimises the JPEG quantisation parameters and encodes the region 1 image data. At step S1411 the encoded data is stored as region 1 encoded data in the region 1 encoded data buffer 1109. It should be added that the region 1 image encoding device 1108 is the image encoding device 0302 described in the second embodiment, and as a result step S1410 will not be described in detail here.

At step S1412 the region-divided image encoding device 1106 and region 2 image encoding device 1110 perform Huffman encoding on the region-divided image data and region 2 image data, and at step S1413 the region-divided image encoded data is stored in the region-divided encoded data buffer 1107, and the region 2 encoded data in the region 2 encoded data buffer 1111.

Figure 17:
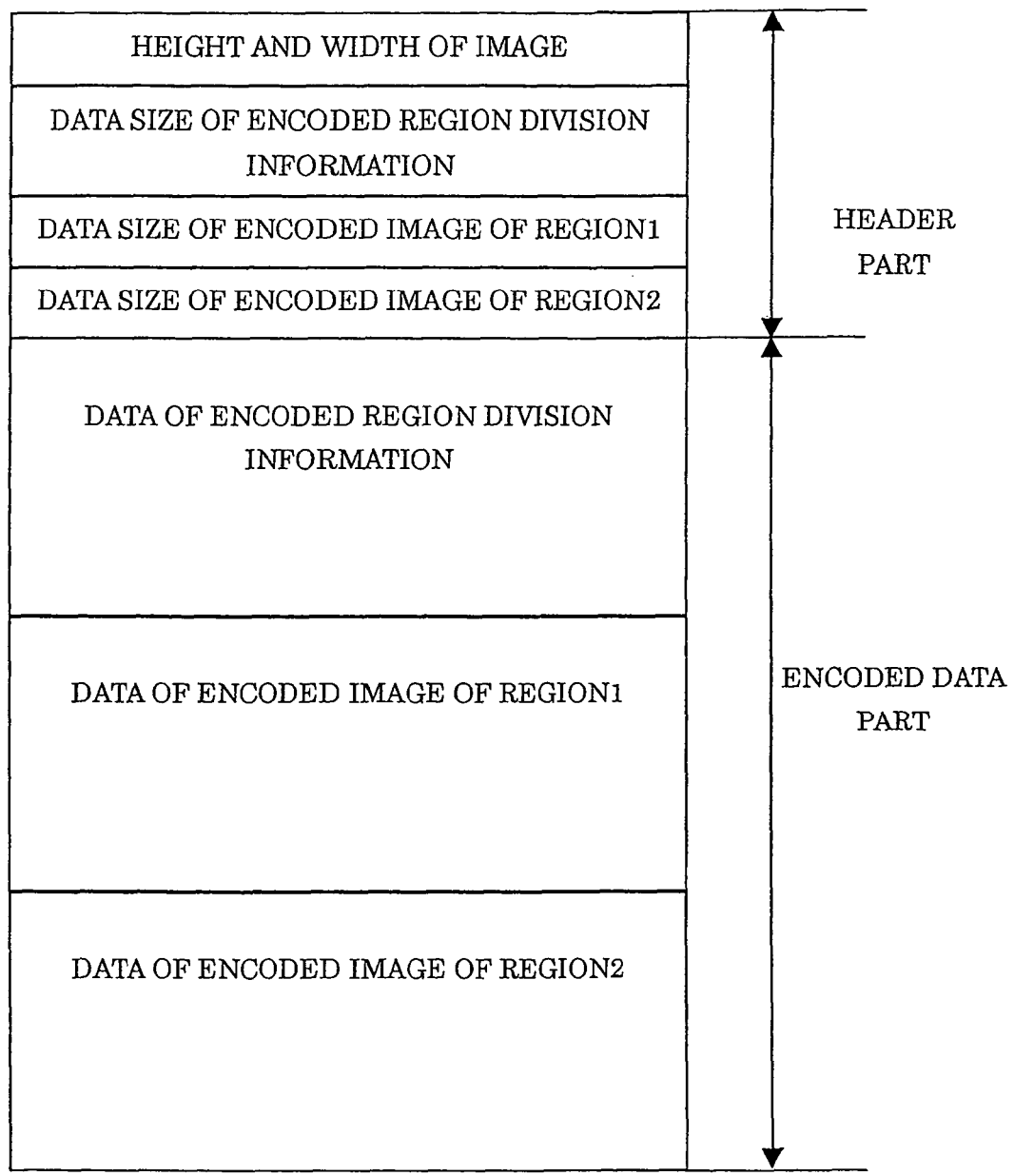
FIG. 17 is a diagram illustrating the configuration of the connected encoded data in the fourth embodiment.

At step S1414 the encoded data combiner 1112 combines the region-divided image encoded data, region 1 encoded data and region 2 encoded data into a single set of combined encoded data as illustrated in FIG. 17. The combined encoded data is output to the data output device 1103.

Figure 16:
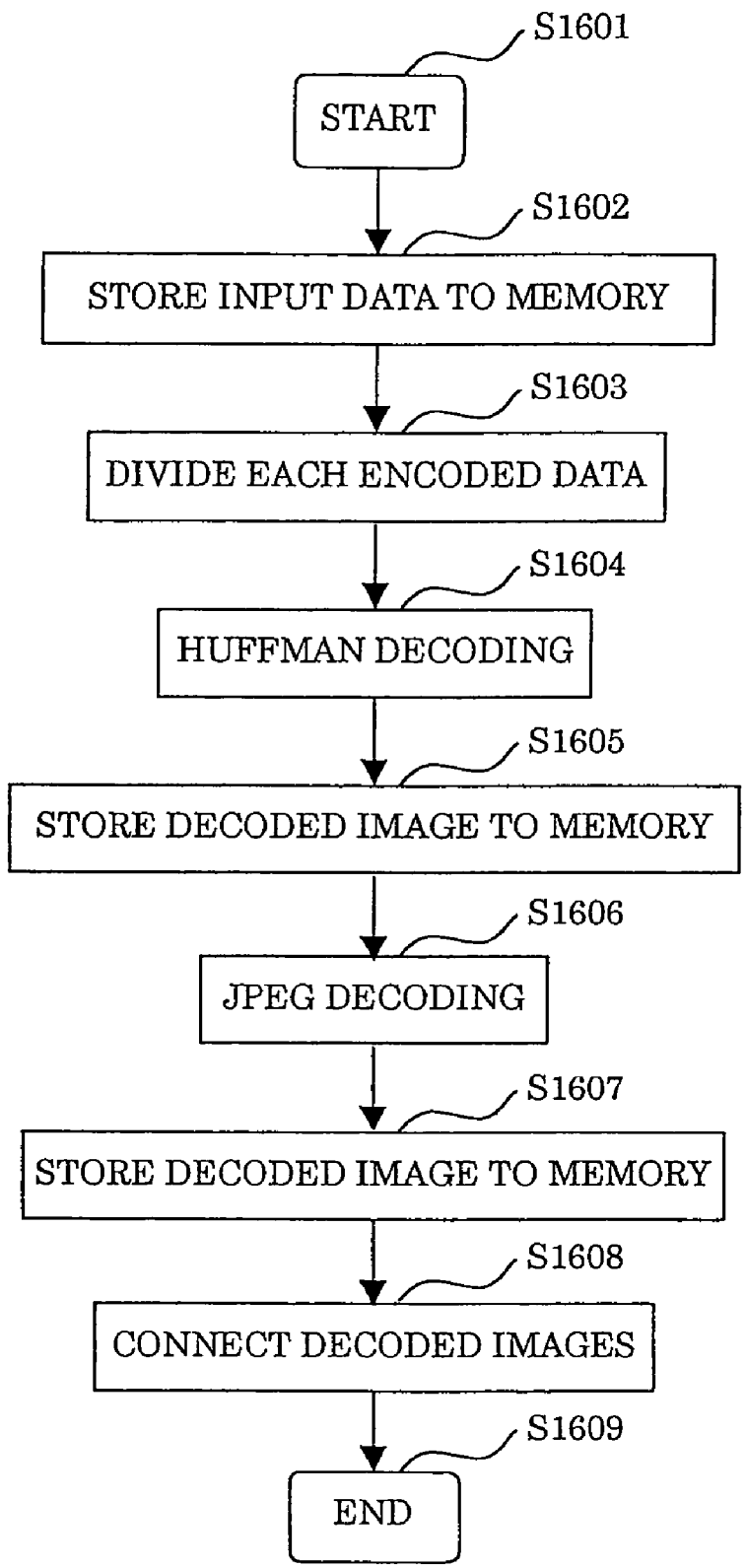
FIG. 16 is a flowchart showing the processing flow in the image decoding device of the fourth embodiment.

FIG. 16 shows the processing flow of the image decoding device 1302.

At step S1602 input data input from the data input device 1301 is stored in the input data buffer 1304.

At step S1603 the encoded data divider 1305 divides it into region-divided image encoded data, region 1 image encoded data and region 2 image encoded data.

At step S1604 the region-divided image decoder 1306 and region 2 image decoder 1310 perform Huffman decoding, and at step S1605 store the region-divided decoded image data in the region-divided decoded image buffer 1307, and the region 2 decoded image data in the region 2 decoded image buffer 1311.

At step S1606 the region 1 image decoder 1308 decodes region 1 encoded data, and at step S1607 stores the decoded region 2 decoded images in the region 2 decoded image data buffer.

At step S1608 the decoded image data combiner 1312 copies corresponding blocks of region 1 decoded images and blocks of region 2 decoded images step in accordance with the pixel values of region-divided decoded images, creates combined decoded image data and outputs it to the image output device 1303. The process ends at step S1609.

It should be noted that the present invention is in no way limited to the above embodiments.

Moreover, the third embodiment may be combined with other embodiments.

INDUSTRIAL APPLICABILITY

The image encoding device to which the present invention pertains makes it possible to evaluate correctly the picture quality of decoded images by extracting and analysing as evaluation indices of the picture quality of decoded images in the irreversible image compression method those parts of the decoded image in which humans tend to sense deterioration, thus allowing the maximum compression rate to be achieved with a visually uniform picture quality. If the user sets the desired degree of picture quality of the decoded images, it further allows the optimum compression rate to be achieved within the desired picture quality by automatically setting the optimum values of the encoding parameters.

The image decoding device to which the present invention pertains, if used in combination with the image encoding device, makes it possible to increase the compression rate considerably without detracting from visual picture quality.

The invention claimed is:

1. An image encoding device comprising:
   means of converting pixel values which reduces pixel value areas where visual detection of deterioration is difficult by applying a pixel value conversion table to an input image, and
   means of image encoding which encodes the image after pixel value conversion,
   wherein the means of image encoding comprises an image encoding device comprising:
   means of image encoding which encodes images in accordance with an irreversible compression method capable of processing input images in small region units,
   means of image decoding which decodes encoded data created with the means of encoding,
   means of characteristic pixel extraction which utilizes input images and decoded images obtained by the means of image decoding to extract characteristic pixels,
   means of calculating characteristic distortion which utilizes characteristic pixels to calculate characteristic distortion of the decoded images in relation to the input images, and
   means of parameter value control which controls parameter values determining the extent of data compression in the means of image encoding in accordance with the characteristic distortion.

2. An image decoding device for decoding encoded data that has been encoded by the image encoding device according to claim 1, comprising:
   means of decoding the encoded data of an input image; and
   means of reconverting the pixel values of a decoded image using a pixel value reconversion table.

3. The image decoding device according to claim 2, wherein the pixel value reconversion means is based on a function wherein the input/output relationship is opposite to that of the means of converting pixel values in an image encoding device comprising:
   means of converting pixel values which reduces pixel value areas where visual detection of deterioration is difficult by applying a pixel value conversion table to an input image; and
   means of image encoding which encodes the image after pixel value conversion.

4. An image decoding device for decoding encoded data encoded by an image encoding device according to claim 1, comprising:

means of converting pixel values which reduces pixel value areas where visual detection of deterioration is difficult by applying a pixel value conversion table to an input image; and means of image encoding which encodes the image after pixel value conversion, the method comprising:

decoding the encoded data of an input image; and reconverting the pixel values of a decoded image using a pixel value reconversion table.

5. A computer readable storage medium for storing a program to be performed by a computer comprising instructions for directing the computer to:

decode encoded data of an input image encoded by an image encoding device according to claim 1 by:

converting pixel values which reduces pixel value areas where visual detection of deterioration is difficult by applying a pixel value conversion table to an input image;

encoding the image after pixel value conversion, decoding the encoded data of an input image; and reconverting the pixel values of a decoded image using a pixel value reconversion table.

6. An image encoding device according to claim 1 further comprising:

means of converting pixel values which reduces pixel value areas where visual detection of deterioration is difficult by applying a pixel value conversion table to an input image so as to reduce the dynamic range of the entire input image; and means of image encoding which encodes the image after pixel value conversion.

7. An image encoding device according to claim 1 further comprising:

means of converting pixel values which reduces pixel value areas with low display reproducibility by applying a pixel value conversion table to an input image; and means of image encoding which encodes the image after pixel value conversion.

8. An image encoding device according to claim 1 further comprising:

means of converting pixel values which reduces pixel value areas with low display reproducibility by applying a pixel value conversion table to an input image so as to reduce the dynamic range of the entire input image; and means of image encoding which encodes the image after pixel value conversion.

9. The image encoding device according to claim 1, wherein the pixel value conversion table utilizes a gamma curve.

10. A non-transitory computer readable storage medium for storing a program to be performed by a computer comprising:

instructions for directing the computer to:

convert pixel values in order to reduce pixel value areas where visual detection of deterioration is difficult by applying a pixel value conversion table to an input image; and encode the image after pixel value conversion wherein said image encoding comprises:

encoding images in accordance with an irreversible compression method capable of processing input images in small region units, extracting characteristic pixels utilizing said input images, calculating characteristic distortion which utilizing characteristic pixels to calculate characteristic distortion of decoded images in relation to the input images, and controlling parameter values determining the extent of data compression in the image encoding in accordance with the characteristic distortion.

* * * * *

UNITED STATES PATENT AND TRADEMARK OFFICE
CERTIFICATE OF CORRECTION

PATENT NO. : 7,830,966 B2
APPLICATION NO. : 11/236010
DATED : November 9, 2010
INVENTOR(S) : Kensaku Kagechi et al.

It is certified that error appears in the above-identified patent and that said Letters Patent is hereby corrected as shown below:

Title Page, insert:

--(30)   Foreign Application Priority Data

Sep. 21, 1999   (JP)......................11-266676--.

Signed and Sealed this
Tenth Day of May, 2011

David J. Kappos
*Director of the United States Patent and Trademark Office*